(12) United States Patent
Uenoyama et al.

(10) Patent No.: US 12,366,770 B2
(45) Date of Patent: Jul. 22, 2025

(54) VARIABLE-PHASE DEVICE

(71) Applicant: HAMAMATSU PHOTONICS K.K., Hamamatsu (JP)

(72) Inventors: Soh Uenoyama, Hamamatsu (JP); Yoshitaka Kurosaka, Hamamatsu (JP); Kazuyoshi Hirose, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 644 days.

(21) Appl. No.: 17/598,465

(22) PCT Filed: Mar. 27, 2020

(86) PCT No.: PCT/JP2020/014239
§ 371 (c)(1),
(2) Date: Sep. 27, 2021

(87) PCT Pub. No.: WO2020/203856
PCT Pub. Date: Oct. 8, 2020

(65) Prior Publication Data
US 2022/0187636 A1      Jun. 16, 2022

(30) Foreign Application Priority Data
Mar. 29, 2019   (JP) .................. 2019-066413

(51) Int. Cl.
G02F 1/03   (2006.01)
(52) U.S. Cl.
CPC .......... G02F 1/0316 (2013.01); G02F 1/0327 (2013.01); *G02F 1/0311* (2013.01); *G02F 2203/50* (2013.01)
(58) Field of Classification Search
CPC ...... G02F 2203/50; G02F 1/01; G02F 1/0316; G02F 1/0311; G02F 1/3027; G02F 1/292;
(Continued)

(56) References Cited

U.S. PATENT DOCUMENTS

2009/0294906 A1   12/2009   Suzuki
2015/0077669 A1*   3/2015   Wu .................. G02F 1/133512
                                                                349/33
(Continued)

FOREIGN PATENT DOCUMENTS

CN   105511118 A   4/2016
CN   106681026 A   5/2017
(Continued)

OTHER PUBLICATIONS

Huang, Yao-Wei et al., "Gate-Tunable Conducting Oxide Metasurfaces," Nano Letters, 2016, 16 (9), p. 5319-p. 5325.
(Continued)

*Primary Examiner* — Sharrief I Broome
*Assistant Examiner* — Journey F Sumlar
(74) *Attorney, Agent, or Firm* — Faegre Drinker Biddle & Reath LLP

(57) ABSTRACT

The present embodiment relates to a variable-phase device including a new device structure that can solve various problems. The variable-phase device includes M pixels (where M is an integer of 2 or more) arrayed one-dimensionally or two-dimensionally, the M pixels each emitting light or modulating light. The array pitch of the M pixels is less than the wavelength of incident light and is constant along a predetermined direction. Each of the M pixels includes N sub-pixels (where N is an integer of 2 or more) each having a structure allowing the phase of outgoing light to vary. With respect to each of the M pixels, N partial light beams outputted from the N sub-pixels are combined into light having a single phase in the far field.

16 Claims, 36 Drawing Sheets

(58) Field of Classification Search
CPC . G02F 1/293; G02F 1/29; G02F 1/295; G02F 1/2955
See application file for complete search history.

(56) References Cited

U.S. PATENT DOCUMENTS

| | | |
|---|---|---|
| 2017/0023803 A1 | 1/2017 | Han et al. |
| 2017/0082842 A1 | 3/2017 | Shaltout et al. |
| 2017/0090221 A1 | 3/2017 | Atwater |
| 2018/0024412 A1 | 1/2018 | Kim et al. |
| 2018/0053450 A1* | 2/2018 | Li .................... G02F 1/0102 |
| 2018/0240653 A1 | 8/2018 | Akselrod et al. |
| 2018/0248267 A1 | 8/2018 | Akselrod |

FOREIGN PATENT DOCUMENTS

| | | |
|---|---|---|
| CN | 107229126 A | 10/2017 |
| CN | 108490603 A | 9/2018 |
| JP | 2008-250220 A | 10/2008 |
| JP | 2018-109731 A | 7/2018 |
| JP | 2019-020715 A | 2/2019 |
| KR | 10-2010-0022944 A | 3/2010 |
| WO | WO-2015/187221 A2 | 12/2015 |
| WO | WO-2017/057700 A1 | 4/2017 |
| WO | WO-2018/130786 A1 | 7/2018 |
| WO | WO-2018/215784 A1 | 11/2018 |
| WO | WO 2019/043016 A1 | 3/2019 |

OTHER PUBLICATIONS

Shirmanesh, Ghazaleh Kafaie et al., "Dual-Gated Active Metasurface at 1550 nm with Wide (>300°) Phase Tunability," Nano Letters, 2018, 18 (5), p. 2957-p. 2963.

Zhang, J. Q. et al, "Electrical tuning of metal-insulator-metal metasurface with electro-optic polymer," Applied Physics Letters, Dec. 4, 2018, vol. 113, p. 231102-1-p. 231102-5.

International Preliminary Report on Patentability mailed Oct. 14, 2021 for PCT/JP2020/014239.

* cited by examiner

VARIABLE-PHASE DEVICE

TECHNICAL FIELD

The present invention relates to a variable-phase device.

BACKGROUND ART

Patent Document 1 discloses a phase-modulated spatial light modulator having a plurality of pixels arrayed two dimensionally.
Non-Patent Documents 1 and 2 disclose gate-tunable metasurfaces.

CITATION LIST

Patent Literature

Patent Document 1: Japanese Patent Application Laid-Open No. 2008-250220

Non-Patent Literature

Non-Patent Document 1: Yao-Wei Huang et al., "Gate-Tunable Conducting Oxide Metasurfaces", Nano Letters, 2016, 16 (9), pp 5319-5325
Non-Patent Document 2: Ghazaleh Kafaie Shirmanesh et al., "Dual-Gated Active Metasurface at 1550 nm with Wide (>300°) Phase Tunability", Nano Letters, 2018, 18 (5), pp 2957-2963

SUMMARY OF INVENTION

Technical Problem

As a result of studying the above-mentioned conventional arts, the present inventors have found the following problems. That is, optical devices for spatially modulating the phase of light have been conventionally used. Such optical device capable of phase modulation has a plurality of pixels arrayed one dimensionally or two dimensionally, and performs spatial phase modulation by giving phases being different among pixels to the light. However, in some structures of the device, there may arise technical problems such as, for example, a limited range of variable phases due to structural restrictions or the like or variations in light intensity among pixels caused by the phases. A new device structure that can solve such various problems is demanded.

An object of an embodiment of the present invention is to provide a variable-phase device having a new device structure that can solve various problems of conventional optical devices capable of phase modulation.

Solution to Problem

In order to solve the above-described problems, a variable-phase device according to one example of the present embodiment includes M pixels (where M is an integer of 2 or more). Each of the M pixels is capable of light emission or light modulation, and the M pixels are one-dimensionally arrayed along a first direction on a reference plane or two-dimensionally arrayed along both the first direction and a second direction intersecting with the first direction. The array pitch, which is defined by a distance between centers of adjacent pixels along at least the first direction out of the M pixels, is less than the wavelength of incident light and is constant along the first direction. In addition, each of the M pixels includes N sub-pixels (where N is an integer of 2 or more) each having a structure capable of changing the phase of incident light. Furthermore, with respect to each of the M pixels, N partial light beams outputted from the N sub-pixels are combined into light having a single phase in the far field.

Advantageous Effects of Invention

According to one example of the present embodiment, a variable-phase device having a new device structure that can solve various problems of conventional optical devices capable of phase modulation can be provided.

DESCRIPTION OF EMBODIMENTS

Description of Embodiments of Present Invention

Figure 1:
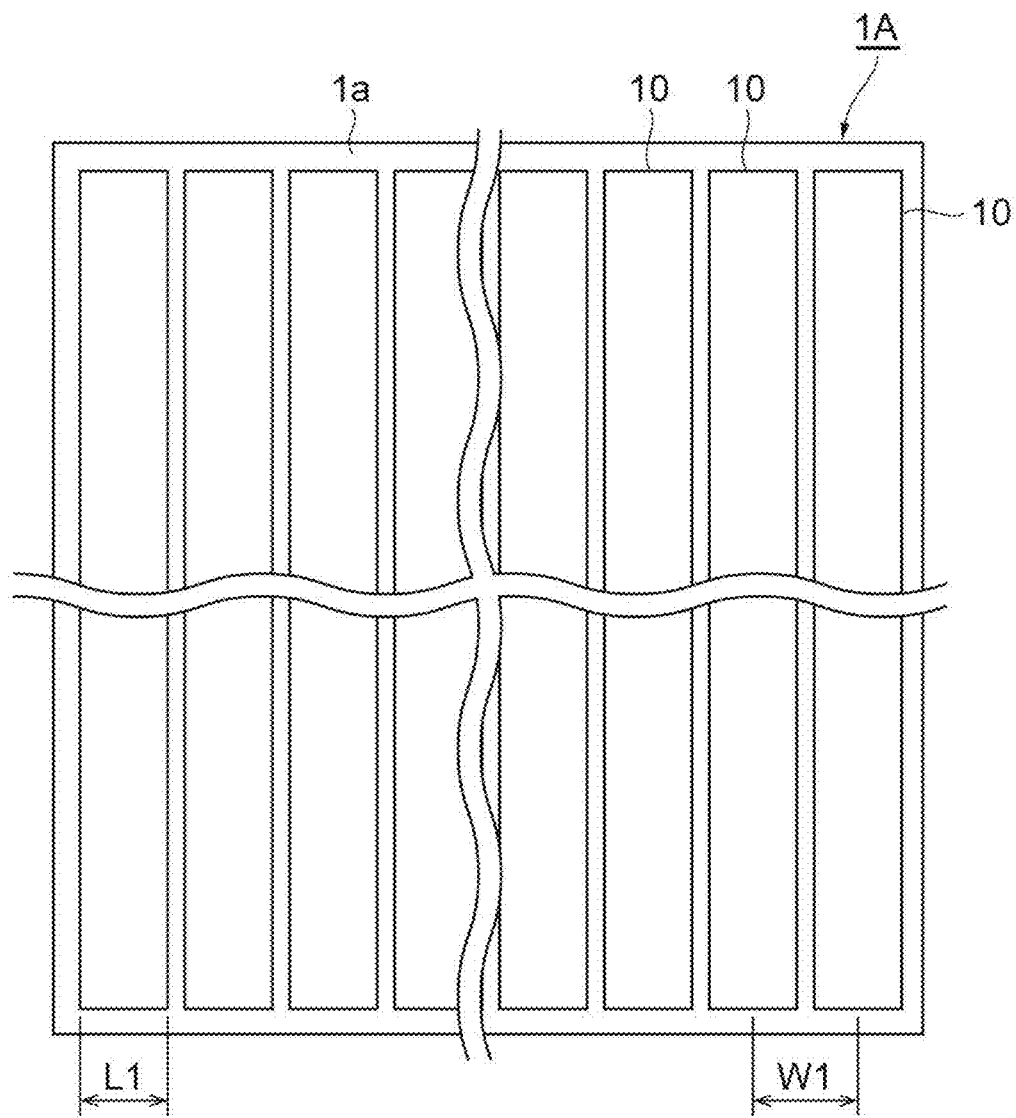
FIG. 1 is a plan view showing a metasurface 1A as a variable-phase device according to a first embodiment of the present invention.
Figure 1:
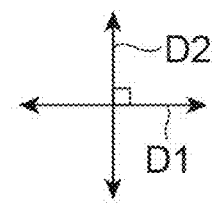

First, embodiments of the present invention will be individually listed and described in detail.

(1) As one aspect, a variable-phase device according to the present embodiment includes M pixels (where M is an integer of 2 or more). Each of the M pixels is capable of light emission or light modulation, and the M pixels are one-dimensionally arrayed along a first direction on a reference plane or two-dimensionally arrayed along both the first direction and a second direction intersecting with the first direction. The array pitch, which is defined by a distance between centers of adjacent pixels along at least the first direction out of the M pixels, is less than the wavelength of incident light and is constant along the first direction. In addition, each of the M pixels includes N sub-pixels (where N is an integer of 2 or more) each having a structure capable of changing the phase of incident light. Furthermore, with respect to each of the M pixels, N partial light beams outputted from the N sub-pixels are combined into light having a single phase in the far field.

In the variable-phase device having the above-described structure, the array pitch of the M pixels is less than the wavelength and is constant along a specific direction. According to new findings made by the present inventors, in such configuration, when N partial light beams having different wavelengths are outputted from N sub-pixels included in one pixel, these partial light beams become combined with each other into light (one light beam) having a single phase and a uniform intensity in the far field (for example, at a distance of about one wavelength or several wavelengths from a pixel surface). The single phase and the uniform intensity are not simply an average of N values but represent a value obtained by vector composition of the phases or the intensities of the individual N partial light beams. Therefore, it is made possible to achieve a desired phase value by appropriately controlling the phases of partial light beams outputted from the N sub-pixels, even if, for example, the desired phase value cannot be attained by conventional pixel structures due to various restrictions. In addition, although a conventional pixel structure may cause various light intensities depending on the pixels, the light intensities of the M pixels can be made close to a uniform value by appropriately combining the phases of the N sub-pixels because light intensities of the sub-pixels variously change with the change in phase. In this way, the variable-phase device makes it possible to provide a variable-phase device having a new device structure that can solve various problems.

(2) As one aspect of the present embodiment, initial phases of N sub-pixels in each of M pixels may be different from each other. For example, such configuration makes it possible expand the range of variable phases of each pixel. Furthermore, as one aspect of the present embodiment, it is preferable that the initial phases of N sub-pixels are shifted from each other by $2\pi/N$ (rad). If the initial phases of N sub-pixels are shifted from each other by $2\pi/N$ (rad), it is made possible to achieve a significant phase change in each pixel while maximizing the initial phase difference between sub-pixels and reducing the range of phase variation in each sub-pixel.

(3) As one aspect of the present embodiment, the variable-phase device may further include a stacked structure, a first metal film, a second metal film, and a drive circuit. The stacked structure includes a first surface coinciding with the reference plane and a second surface opposed to the first surface, and further includes a transparent conductive layer and a dielectric layer. The first metal film is disposed on the first surface side of the stacked structure. The second metal film is disposed on the second surface side of the stacked structure and reflects the incident light taken into the stacked structure via the first surface toward the first surface. The drive circuit controls a voltage applied between the first metal film and the second metal film. In particular, the first metal film includes a plurality of partial films that are disposed on N sub-pixels and separated from each other. Each of the N sub-pixels includes its corresponding partial film among the plurality of partial films and includes a pair of portions. The pair of portions are exposed from the first metal film so as to sandwich the corresponding partial film as viewed from the stacking direction from the first surface to the second surface. The drive circuit may modulate the phase of each of N partial light beams outputted from the N sub-pixels. In this case, the drive circuit individually controls the potential of each of the plurality of partial films of the first metal film.

In the variable-phase device, each of N sub-pixels on the first surface of the stacked structure defined in each of M pixels includes a pair of portions (a pair of exposed portions). The pair of portions being exposed from the first metal film are disposed so as to sandwich the partial film included in the first metal film as viewed from the stacking direction of the stacked structure (the direction from the first surface to the second surface). The incident light reaching one of the pair of portions is reflected by the second metal film and outputted toward the outside from the other one of the pair of portions. If the width of the first metal film and the thickness of the stacked structure are sufficiently smaller than the wavelength of incident light, when a drive voltage is applied between the first metal film and the second metal film, induced currents in opposite directions called the gap-surface plasmon mode are generated on each of the first metal film and the second metal film. That is, strong magnetic resonance (plasmon resonance) occurs in the stacked structure. The phase of incident light (light to be modulated) passing between the first metal film and the second metal film is modulated by the magnetic resonance. Here, when a drive voltage is applied between the first metal film and the second metal film, the electron density near the interface between the transparent conductive layer and the dielectric layer increases. As a result, a portion of the transparent conductive layer near the interface is metallized and the effective refractive index of the stacked structure changes. The amount of the above-mentioned phase modulation is dependent on the effective refractive index of the stacked structure. Therefore, by changing the drive voltage, it is possible to control the effective refractive index and thus to control the phase of the outgoing light (the incident light that is reflected by the second metal film and outputted after phase modulation). Note that such structure is a type of dynamic metasurface and is called a gate-tunable metasurface. In the variable-phase device, the stacked structure includes the above-described pair of portions in each of N sub-pixels. Furthermore, the first metal film includes a plurality of partial films that are disposed on each of sub-pixels and separated from each other. The drive circuit individually controls the potential of each of the plurality of partial films, thereby achieving independent phase modulation for each sub-pixel. Therefore, the variable-phase device suitably achieves sub-pixels each having a structure capable of changing the phase of incident light.

(4) As one aspect of the present embodiment, the variable-phase device may further include a stacked structure, a first metal film, a second metal film, and a drive circuit. The stacked structure includes a first surface coinciding with the reference plane, the first surface being the surface that incident light will reach, and a second surface being opposed to the first surface, and the stacked structure further includes a transparent conductive layer and a dielectric layer. The first metal film is disposed on the first surface side of the stacked structure. The second metal film is disposed on the second surface side of the stacked structure. In addition, the second metal film reflects the incident light taken into the stacked structure via the first surface toward the first surface. The drive circuit controls a voltage applied between the first metal film and the second metal film. In particular, the first metal film includes a plurality of partial films that are disposed on each of N sub-pixels and separated from each other. Each of the N sub-pixels includes its corresponding partial film among the plurality of partial films and a pair of portions exposed from the first metal film so as to sandwich the corresponding partial film as viewed from the stacking direction from the first surface to the second surface. In order that the initial phases of N sub-pixels are different from each other, the widths of the plurality of partial films disposed on each of the N sub-pixels are different from each other, the widths being defined along the first direction. Furthermore, the drive circuit may modulate the phase of each of N partial light beams outputted from the N sub-pixels. In this case, the drive circuit individually or collectively controls the potential of each of the plurality of partial films of the first metal film.

In such configuration, each sub-pixel has the above-mentioned gate-tunable metasurface structure. Therefore, phases can be controlled for each sub-pixel. Furthermore, in the variable-phase device, initial phases of N sub-pixels are different from each other, and the drive circuit individually or collectively controls a voltage between each of the plurality of partial films and the second metal film. For example, such configuration makes it possible expand the range of variable phases of each pixel. Furthermore, as one aspect of the present embodiment, the initial phases of N sub-pixels may be shifted from each other by $2\pi/N$ (rad). In this case, it is made possible to achieve a significant phase change in each pixel while maximizing the initial phase difference between sub-pixels and reducing the range of phase variation in each sub-pixel.

(5) As one aspect of the present embodiment, the variable-phase device may further include a refractive index modulation layer, a Si film, a metal film, and a drive circuit. The refractive index modulation layer includes a first surface coinciding with the reference plane and a second surface opposed to the first surface, and the refractive index modulation layer further includes a dielectric material. The Si film is disposed on the first surface side of the refractive index modulation layer. The metal film is disposed on the second surface side of the refractive index modulation layer. In addition, the metal film reflects the incident light taken into the refractive index modulation layer via the first surface toward the first surface. The drive circuit controls a voltage applied between the Si film and the metal film. In particular, the Si film includes a plurality of partial films that are disposed on each of N sub-pixels and separated from each other. The drive circuit may modulate the phase of each of N partial light beams outputted from the N sub-pixels. In this case, the drive circuit individually controls the potential of each of the plurality of partial films of the Si film. For example, such structure also enables phases to be independently controlled for each sub-pixel.

(6) As one aspect of the present embodiment, the variable-phase device may further include an electro-optic crystal layer, a first transparent electrode film, a light reflecting surface, a second transparent electrode film, and a drive circuit. The electro-optic crystal layer includes a first surface coinciding with the reference plane and a second surface opposed to the first surface. The first transparent electrode film is disposed on the first surface side of the electro-optic crystal layer. The light reflecting surface is disposed on the second surface side of the electro-optic crystal layer. In addition, the light reflecting surface reflects the incident light taken into the electro-optic crystal layer via the first surface toward the first surface. The second transparent electrode film is disposed between the light reflecting surface and the second surface of the electro-optic crystal layer. The drive circuit controls a voltage applied between the first transparent electrode film and the second transparent electrode film. In particular, at least one of the first transparent electrode film and the second transparent electrode film includes a plurality of partial films that are disposed on each of N sub-pixels and separated from each other. The drive circuit may modulate the phase of each of N partial light beams outputted from the N sub-pixels. In this case, the drive circuit individually controls the potential of each of the plurality of partial films included in at least one of the first transparent electrode film and the second transparent electrode film. For example, such structure also enables phases to be independently controlled for each sub-pixel.

(7) As one aspect of the present embodiment, the variable-phase device may further include an electro-optic crystal layer, a first transparent electrode film, a light reflecting surface, a second transparent electrode film, and a drive circuit. The electro-optic crystal layer includes a first surface coinciding with the reference plane and a second surface opposed to the first surface. The first transparent electrode film is disposed on the first surface side of the electro-optic crystal layer. The light reflecting surface is disposed on the second surface side of the electro-optic crystal layer. In addition, the light reflecting surface reflects the incident light taken into the electro-optic crystal layer via the first surface toward the first surface. The second transparent electrode film is disposed between the light reflecting surface and the second surface of the electro-optic crystal layer. The drive circuit controls a voltage applied between the first transparent electrode film and the second transparent electrode film. In particular, at least one of the first transparent electrode film and the second transparent electrode film includes a plurality of partial films that are disposed on each of N sub-pixels and separated from each other. In order that initial phases of N sub-pixels are different from each other, the optical distance between the second transparent electrode film and the light reflecting surface is different between or among the N sub-pixels. The drive circuit may modulate the phase of each of N partial light beams outputted from the N sub-pixels. In this case, the drive circuit individually or collectively controls the potential of the plurality of partial films included in at least one of the first transparent electrode film and the second transparent electrode film. For example, such structure also enables phases to be independently controlled for each sub-pixel. Furthermore, in the variable-phase device, the optical distance between the second transparent electrode film and the light reflecting surface is different between or among N partial films (corresponding to the N sub-pixels on a one-to-one basis) in each pixel, and thus the initial phases of the N sub-pixels are different from each other. Then, the drive circuit individually or collectively controls voltages on the plurality of partial films. For example, such configuration makes it possible expand the range of variable phases of each pixel.

In addition, as one aspect of the present embodiment, it is preferable that the initial phases of N sub-pixels are shifted from each other by 2π/N (rad). In this case, it is made possible to achieve a significant phase change in each pixel while maximizing the initial phase difference between sub-pixels and reducing the range of phase variation in each sub-pixel.

Every one of the aspects listed in the [Description of Embodiments of the Present Invention] section above can be applied to each of all the remaining aspects or to every combination of these remaining aspects.

Details of Embodiments of Present Invention

Specific structures of the variable-phase device according to the present embodiment will now be described in detail with reference to the accompanying drawings. Note that the present invention is not limited to these examples but is defined by the claims, and is intended to include every modification within the meaning and scope equivalent to the claims. In the description of the drawings, identical reference numerals are given to identical elements and duplicate descriptions are omitted.

First Embodiment

FIG. 1 is a plan view showing a metasurface 1A as a variable-phase device according to an embodiment of the present invention. The metasurface 1A of the present embodiment is called a "gate-tunable metasurface". The "metasurface" includes a plurality of unit structures that are each sufficiently smaller than the wavelength of incident light and are arrayed on a flat surface, whereby the phase, intensity, or polarization state of the incident light is changed for each unit structure. There are various structures of a metasurface. The metasurface 1A of the present embodiment has a structure called a gap plasmon type, which is one of these structures. The metasurface 1A is a flat plate-like device extending along directions D1 and D2 intersecting with (for example, orthogonal to) each other, and the thickness direction (or stacking direction) of the device is a direction intersecting with (for example, orthogonal to) both the directions D1 and D2.

On a main surface 1a of the metasurface 1A, M pixels 10 are formed (where M is an integer of 2 or more). The M pixels 10 are one-dimensionally arrayed along the direction D1 (a first direction). The array pitch (the distance between centers of adjacent pixels 10 defined along the direction D1) W1 of the M pixels 10 is less than the wavelength of incident light and is constant along the direction D1. Note that the array pitch W1 may be 50% or less of the wavelength of incident light. The wavelength of incident light falls within the range of, for example, 400 to 3,000 nm, and is 1,550 nm in one example. The array pitch W1 for such wavelength of incident light falls within the range of, for example, 200 to 1,500 nm, and is 400 nm in one example. The planar shape of each pixel 10 is rectangular (for example, a rectangular shape whose longitudinal direction is along the direction D2 intersecting with the direction D1, which is the array direction). The width L1 of each pixel 10 with respect to the direction D1 (the distance between edges of each pixel defined along the direction D1) falls within the range of, for example, 200 to 400 nm. The metasurface 1A is used for various purposes including lens applications and hologram formation by individually modulating the phase of incident light reaching the main surface 1a for each pixel 10.

Figure 2:
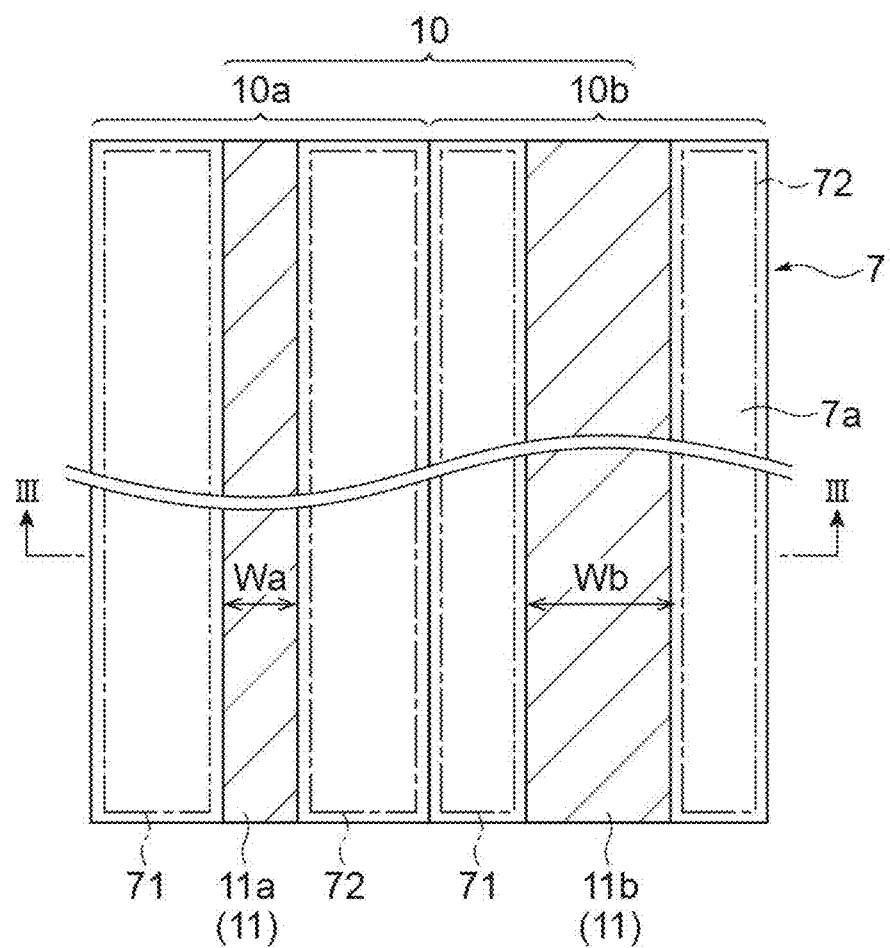
FIG. 2 is an enlarged plan view of one pixel 10.
Figure 2:
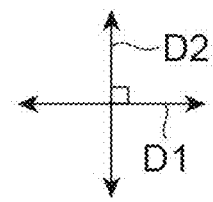

FIG. 2 is an enlarged plan view of one pixel 10. As illustrated in FIG. 2, each pixel 10 includes N sub-pixels 10a, 10b (where N is an integer of 2 or more; the figure shows the case of N=2). Note that the number N of sub-pixels may be the same as, or different from, the number M of pixels 10. Each of the sub-pixels 10a, 10b is equivalent to the above-described unit structure and has a structure capable of changing the phase of incident light. The N sub-pixels 10a, 10b are arranged in a line along the array direction of the M pixels 10 (the direction D1 in the present embodiment). The array direction of the sub-pixels 10a, 10b may intersect with the array direction of the M pixels 10. The widths of the sub-pixels 10a, 10b defined along the array direction are equal to each other. In a case where N is 3 or more, the array pitch of the sub-pixels (the distance between centers of adjacent sub-pixels along the direction D1) is constant along the array direction of the N sub-pixels.

Figure 3:
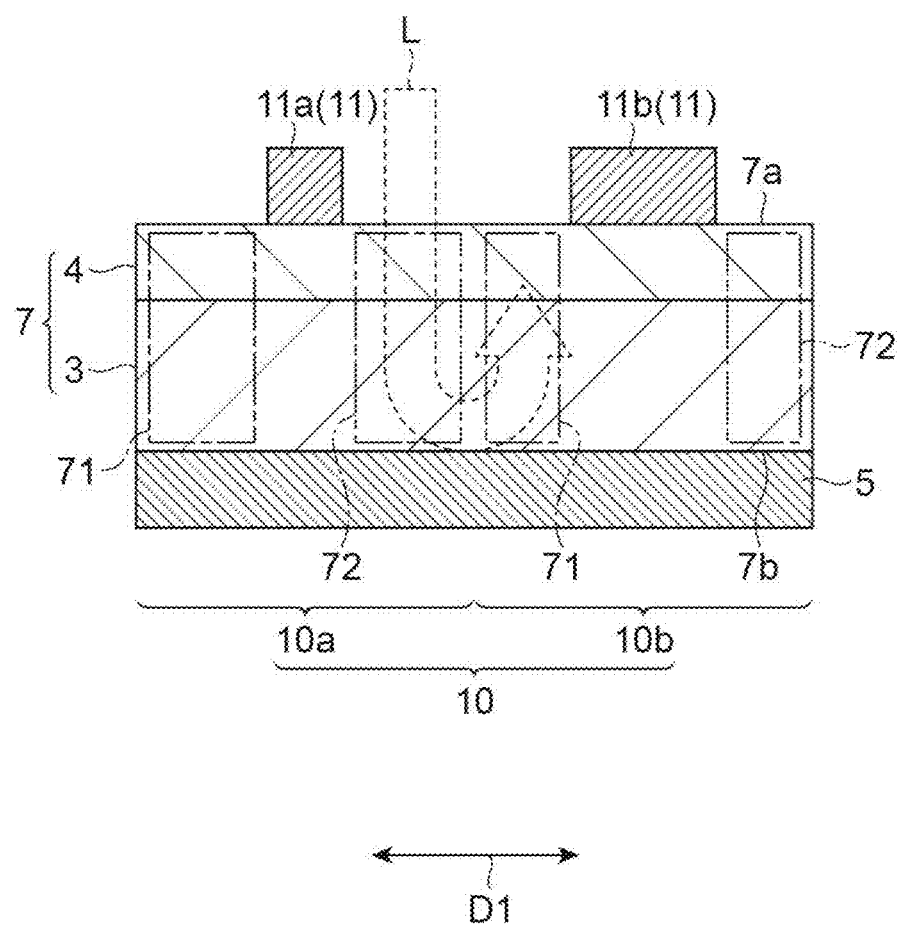
FIG. 3 is a cross-sectional view taken along line III-III in FIG. 2, showing a cross-sectional structure of each pixel 10 included in the metasurface 1A.

FIG. 3 is a cross-sectional view taken along line III-III in FIG. 2, showing a cross-sectional structure of each pixel 10 included in the metasurface 1A. As illustrated in FIG. 3, the metasurface 1A includes a metal film 5, a stacked structure 7 stacked on the metal film 5, and a metal film 11 disposed on the stacked structure 7. That is, the stacked structure 7 is disposed between the metal film 5 and the metal film 11.

The stacked structure 7 is a flat film extending along the directions D1 and D2. The stacked structure 7 has a main surface 7a and a rear surface 7b. To the main surface 7a, light L to be modulated (the incident light to be outputted after phase modulation as outgoing light) is inputted. The light L to be modulated is, for example, laser light and includes linearly polarized light. The main surface 7a and the rear surface 7b are opposed to each other with respect to the thickness direction of the stacked structure 7. The distance between the main surface 7a and the rear surface 7b (that is, the thickness of the stacked structure 7) is set to be sufficiently smaller than the wavelength of the light L to be modulated. The thickness of the stacked structure 7 falls within the range of, for example, 10 to 100 nm. The stacked structure 7 includes a semiconductor layer 3 and a dielectric layer 4 stacked in the thickness direction of the stacked structure 7.

The semiconductor layer 3 is an inorganic film (transparent conductive layer) having optical transparency and conductivity. The optical transparency refers to the property of having an extremely low level of light absorption (for example, the light absorption rate of 20% or less) with respect to the wavelength of the light L to be modulated.

The conductivity refers to the property of having an extremely low electrical resistivity (for example, the resistivity of $10^{-6}$ Ω·m or less). The semiconductor layer 3 of the present embodiment contains at least one of indium oxide ($In_2O_3$) and zinc oxide ($Zn_2O_3$) whose resistance is reduced by a dopant. The dopant for indium oxide is, for example, Sn. Indium oxide doped with Sn is called ITO. The dopant for zinc oxide is, for example, Al or Ga. Zinc oxide doped with Al is called AZO. Zinc oxide doped with Ga is called GZO. The thickness of the semiconductor layer 3 falls within the range of, for example, 5 to 30 nm, and is 20 nm in one example.

The dielectric layer 4 is an inorganic film having optical transparency and insulation properties. The insulation properties refer to the property of having an extremely high electrical resistivity (for example, the resistivity of $10^{-6}$ Ω·m or more). The dielectric layer 4 contains, for example, at least one of aluminum oxide ($Al_2O_3$), silicon oxide ($SiO_2$), silicon nitride ($Si_3N_4$), and hafnium oxide ($HfO_2$). The thickness of the dielectric layer 4 falls within the range of, for example, 3 to 10 nm, and is 5 nm in one example. In the present embodiment, the dielectric layer 4 is located on the main surface 7a side relative to the semiconductor layer 3.

Note that, in the present embodiment, the semiconductor layer 3 is disposed on the rear surface 7b side and the dielectric layer 4 is disposed on the main surface 7a side; however, the semiconductor layer 3 may be disposed on the main surface 7a side and the dielectric layer 4 may be disposed on the rear surface 7b side. In addition, in the present embodiment, the semiconductor layer 3 forms the rear surface 7b and the dielectric layer 4 forms the main surface 7a; however, another layer may be further disposed between layers of the semiconductor layer 3 and the dielectric layer 4 and the main surface 7a and/or the rear surface 7b. Furthermore, another layer may be further disposed between the semiconductor layer 3 and the dielectric layer 4.

The metal film 11, which is an example of a first metal film in the present embodiment, has conductivity and light shielding properties and functions as a nano-antenna in the metasurface structure. The metal film 11 is disposed on the main surface 7a side of the stacked structure 7. The metal film 11 is a film comprised of a metal such as gold (Au). The film thickness of the metal film 11 falls within the range of, for example, 30 to 100 nm, and is 50 nm in one example. The metal film 11 includes a partial film 11a disposed on the stacked structure 7 of the sub-pixel 10a and a partial film 11b disposed on the stacked structure 7 of the sub-pixel 10b. As illustrated in FIG. 2, the partial films 11a and 11b are arranged along the direction D1 and separated from each other. The center positions of the partial films 11a and 11b with respect to the direction D1 coincide with the center positions of the sub-pixels 10a and 10b, respectively, with respect to the same direction. The widths Wa and Wb of the partial films 11a and 11b with respect to the direction D1 are set to be smaller than the width of the sub-pixels 10a and 10b with respect to the same direction, and to be sufficiently smaller than the wavelength of the light L to be modulated. In addition, the widths Wa and Wb are different from each other. The array pitch of the partial films 11a and 11b falls within the range of, for example, 100 to 500 nm, and the ratio (duty ratio) of the widths Wa and Wb to the thickness falls within the range of, for example, 0.1 to 0.9.

As described above, the widths Wa and Wb of the partial films 11a and 11b are smaller than the widths of the sub-pixels 10a and 10b, respectively. In addition, the partial films 11a and 11b are placed substantially at the centers of the sub-pixels 10a and 10b, respectively, with respect to the direction D1. Accordingly, as shown in FIGS. 2 and 3, the stacked structure 7 includes a pair of portions 71 and 72 in each of the sub-pixels 10a and 10b. The pair of portions 71 and 72 are disposed at a pair of positions sandwiching the partial film 11a (or 11b) as viewed from the thickness direction of the stacked structure 7, and are exposed from the metal film 11. The array direction (that is, the direction D1) of the pair of portions 71 and 72 coincides with the polarization direction of the light L to be modulated.

The metal film 5 is an example of a second metal film in the present embodiment. The metal film 5 is disposed on the rear surface 7b side of the stacked structure 7. In one example, the metal film 5 is in contact with the rear surface 7b. The metal film 5 reflects the light L to be modulated that is inputted to the stacked structure 7 toward the main surface 7a. The metal film 5 is comprised of a metal such as gold (Au). The film thickness of the metal film 5 is greater than the thickness of the metal film 11, falls within the range of, for example, 80 to 200 nm, and is 150 nm in one example. The metal film 5 is disposed in each of the M pixels 10 and is located within each pixel 10. The metal films 5 in adjacent pixels 10 are separated from each other. The planar shape of the metal film 5 is substantially the same as the planar shape of the pixel 10, and in one example, the planar shape of the metal film 5 is rectangular (for example, a rectangular shape whose longitudinal direction is along the direction D2).

Figure 4:
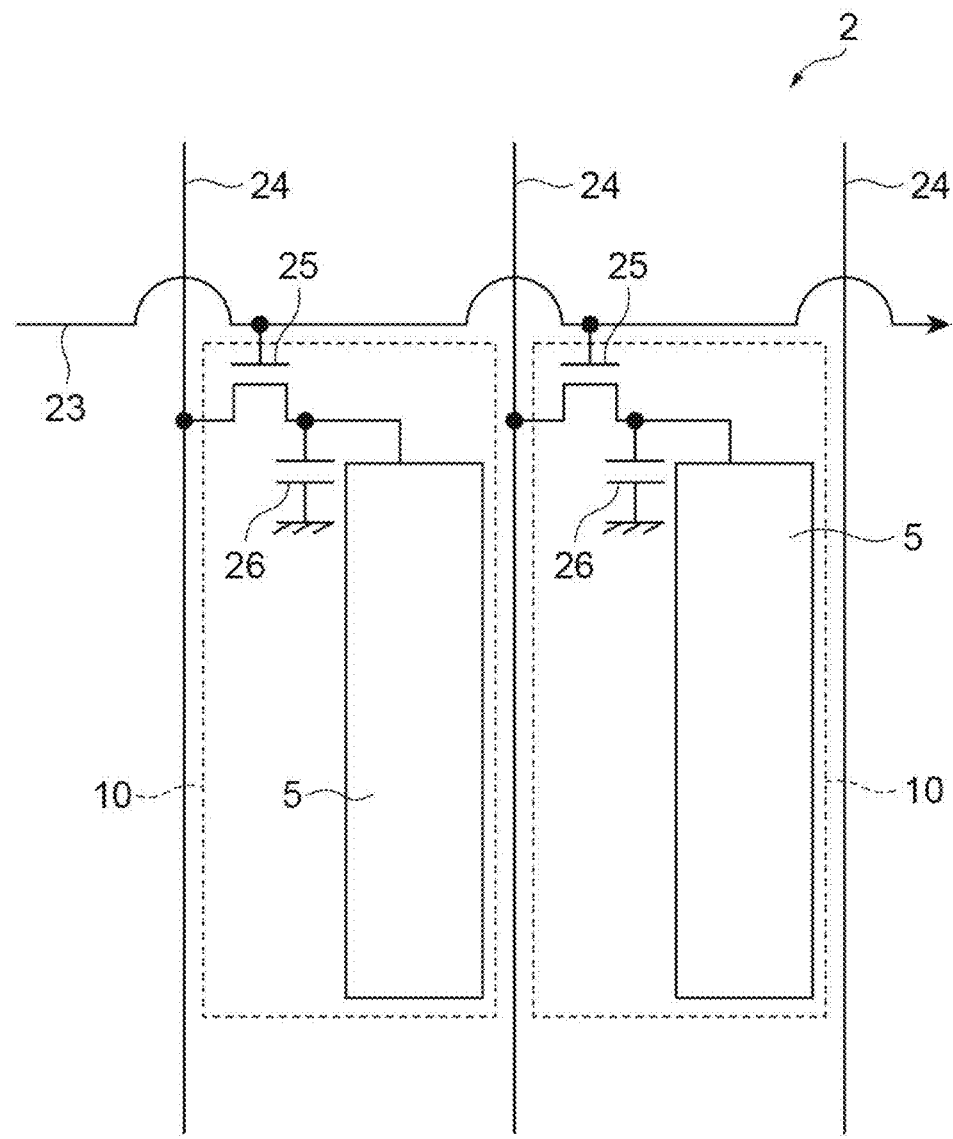
FIG. 4 is a circuit diagram illustrating a configuration of a drive circuit 2.
Figure 4:
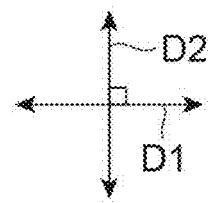

FIG. 4 is a circuit diagram illustrating a configuration of a drive circuit 2. The drive circuit 2 controls a voltage applied between the metal film 11 and the metal film 5 independently for each pixel 10. The drive circuit 2 of the present embodiment sets the potentials of the partial films 11a and 11b to a common reference potential (GND potential) and controls the voltage on the metal film 5 individually for each pixel 10 using a transistor 25. Note that FIG. 4 partially illustrates the drive circuit 2 for two pixels 10, and the configuration of the drive circuit 2 applies to the other pixels 10.

The drive circuit 2 includes one gate drive line 23 and M voltage supply lines 24. The gate drive line 23 extends along the array direction (direction D1) of the M pixels 10. The M voltage supply lines 24 each extend along the direction (direction D2) intersecting with the array direction of the M pixels 10 and are arranged along the direction D1. The gate drive line 23 is electrically connected to a control terminal (a gate) of the transistor 25 provided in each pixel 10. The voltage supply line 24 on the m-th column (where m=1, 2, . . . , M) is electrically connected to one of current terminals (for example, a source) of the transistor 25 provided in the pixel 10 located on the m-th column. Another one of the current terminals (for example, a drain) of the transistor 25 is electrically connected to the metal film 5 of the pixel 10 via wiring in the pixel 10.

The drive circuit 2 further includes a plurality of capacitors 26 disposed in each pixel 10. The capacitor 26, which is an example of a voltage holding unit in the present embodiment, holds a voltage applied to the metal film 5 in each pixel 10 for each individual metal film 5. As the voltage holding unit, any of various configurations capable of holding a voltage other than capacitors can also be employed. The capacitor 26 is, for example, a parallel plate capacitor. One electrode of the capacitor 26 is connected to the metal film 5, and the other electrode is connected to a constant potential region (for example, the reference potential region). The metal film 5 may serve as one electrode of the capacitor 26.

Figure 5:
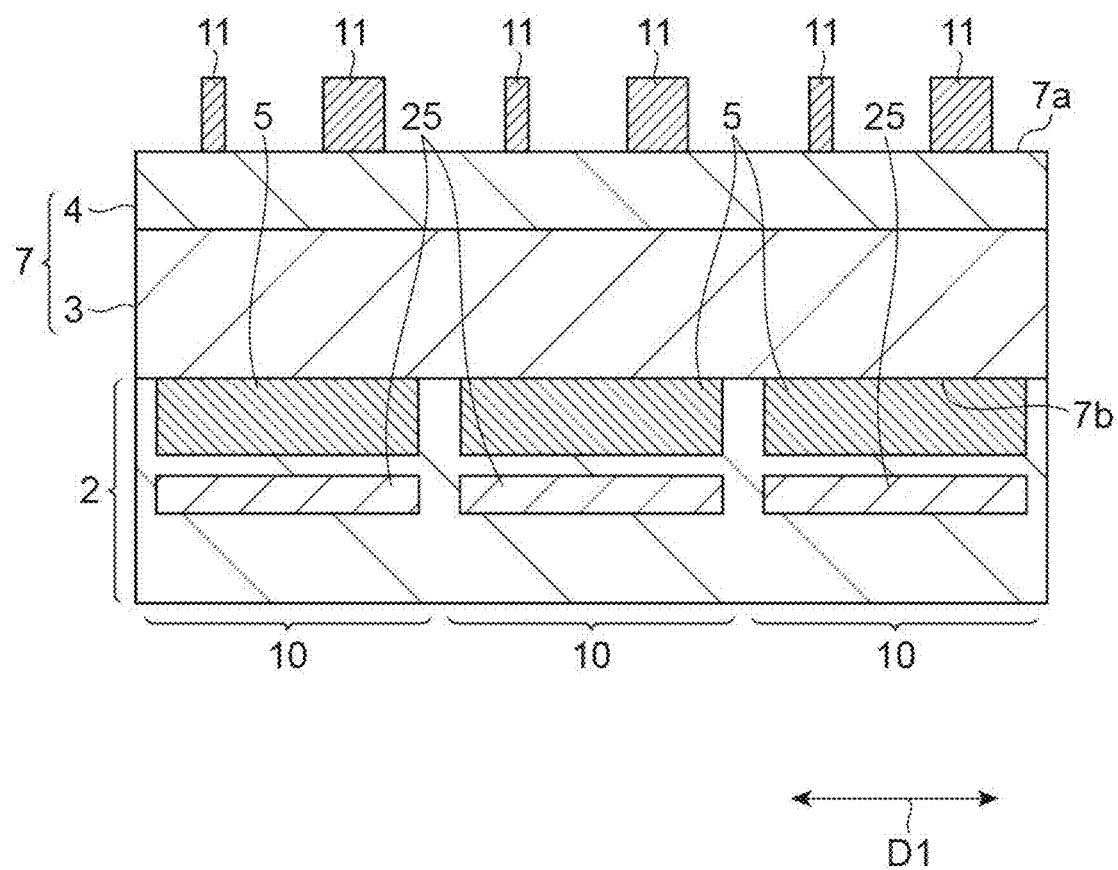
FIG. 5 is a cross-sectional view showing a structure in which the metasurface 1A includes the drive circuit 2.

FIG. 5 is a cross-sectional view showing a structure in which the metasurface 1A includes the drive circuit 2. In this case, the drive circuit 2 may be formed into a substrate-like member including a plurality of the transistors 25. The drive circuit 2 is located on the rear surface 7b side of the stacked structure 7. Each of the transistors 25 is disposed to correspond to each pixel 10 and is located within each pixel 10 as viewed from the thickness direction of the stacked structure 7. The transistor 25 is, for example, a thin-film transistor disposed on a substrate including a dielectric material. The metal film 5 is disposed above each transistor 25 via an insulating film.

Figure 6A:
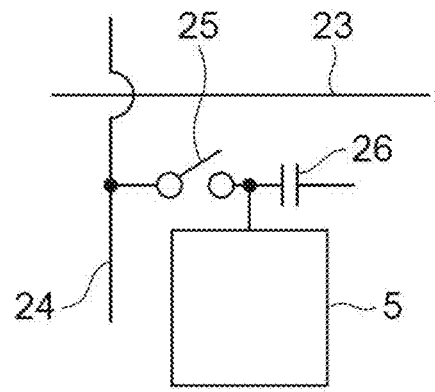
FIGS. 6A to 6D are diagrams for explaining operations of the drive circuit 2 in the pixel 10 on the m-th column.
Figure 6B:
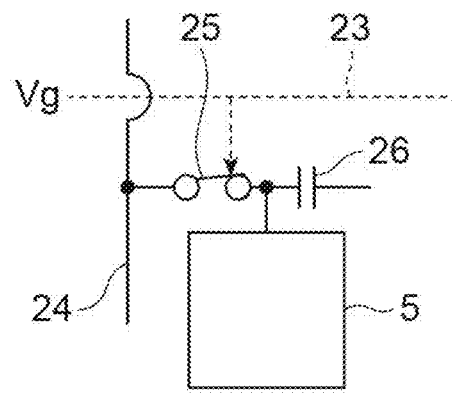
Figure 6C:
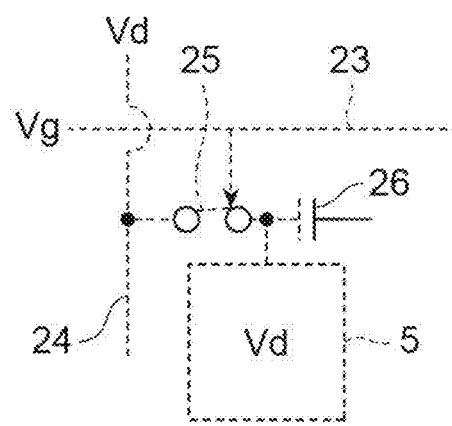
Figure 6D:
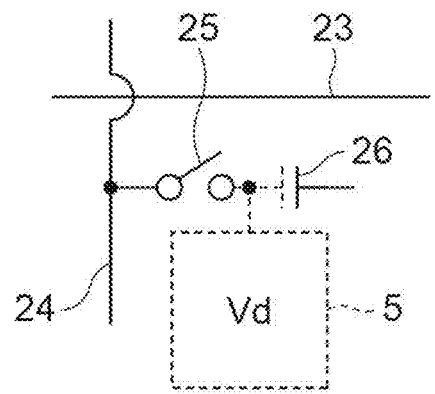

FIGS. 6A to 6D are diagrams for explaining operations of the drive circuit 2 in the pixel 10 on the m-th column. In FIGS. 6A to 6D, a broken line indicates a portion having a significant voltage value. First, in the state shown in FIG. 6A, no voltage is applied to the gate drive line 23 or the voltage supply line 24 on the m-th column, and thus the transistor 25 is in the non-conductive state. Next, as shown in FIG. 6B, when a predetermined gate voltage Vg is applied to the gate drive line 23, the transistor 25 goes into the conductive state, and the voltage supply line 24 on the m-th column and the metal film 5 are connected to each other via the transistor 25. Subsequently, as shown in FIG. 6C, a drive voltage Vd is applied to the voltage supply line 24 on the m-th column. The voltage value of the drive voltage Vd is set independently for each of the pixels 10 on the basis of a desired phase modulation pattern presented to the metasurface 1A. Thus, the drive voltage Vd is applied to the metal film 5 via the transistor 25, and at the same time, the drive voltage Vd is held by the capacitor 26. Then, as shown in FIG. 6D, the gate drive line 23 no longer supplies the gate voltage Vg, and the voltage supply line 24 on the m-th column stops supplying the drive voltage Vd. At the same time, the transistor 25 goes into the non-conductive state again, but the capacitor 26 holds the drive voltage Vd on the metal film 5. Such operation is performed sequentially or simultaneously on all the pixels 10, and the drive circuit 2 individually controls the drive voltages Vd on a plurality of the metal films 5, whereby a desired phase modulation pattern is presented to the metasurface 1A and the phase of the light L to be modulated is modulated for each pixel 10.

Figure 7:
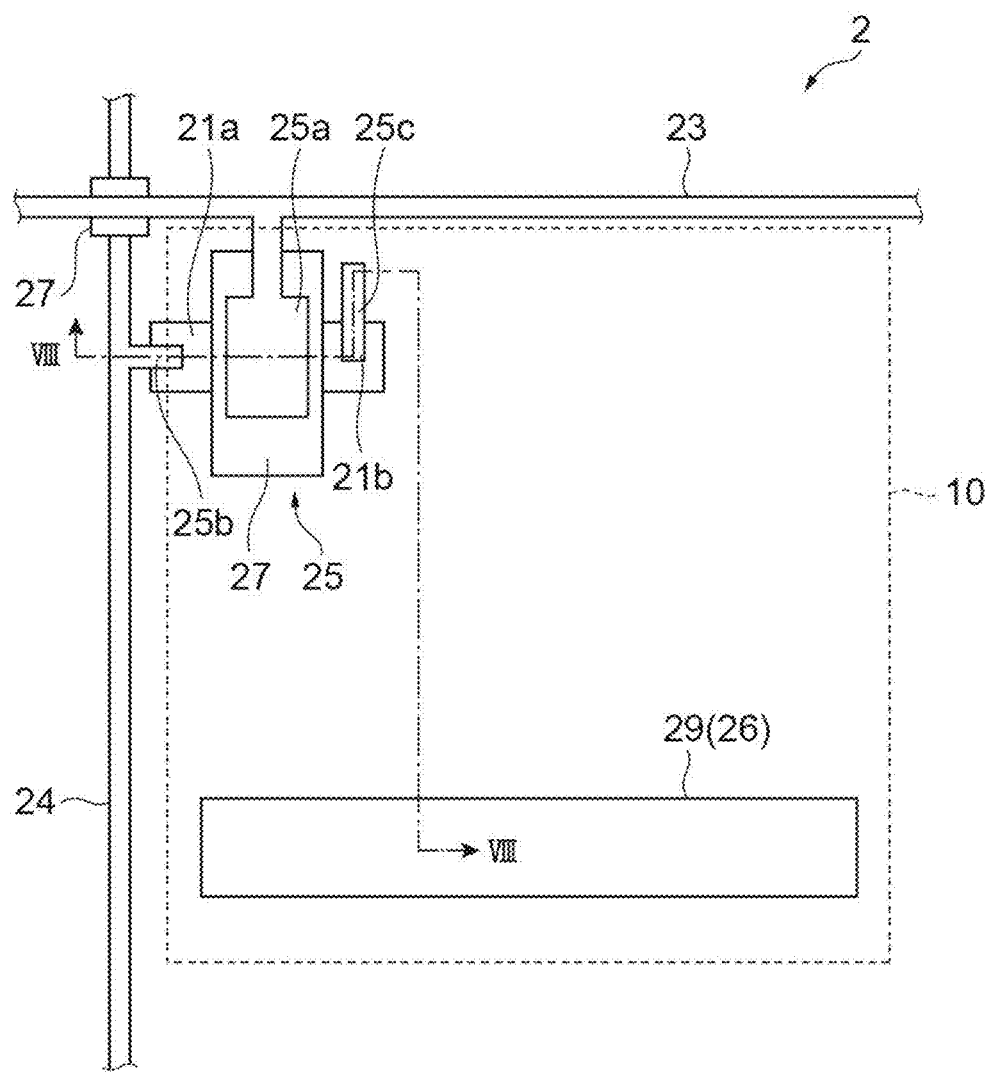
FIG. 7 is a plan view showing a structure of the drive circuit 2 in each pixel 10.
Figure 8:
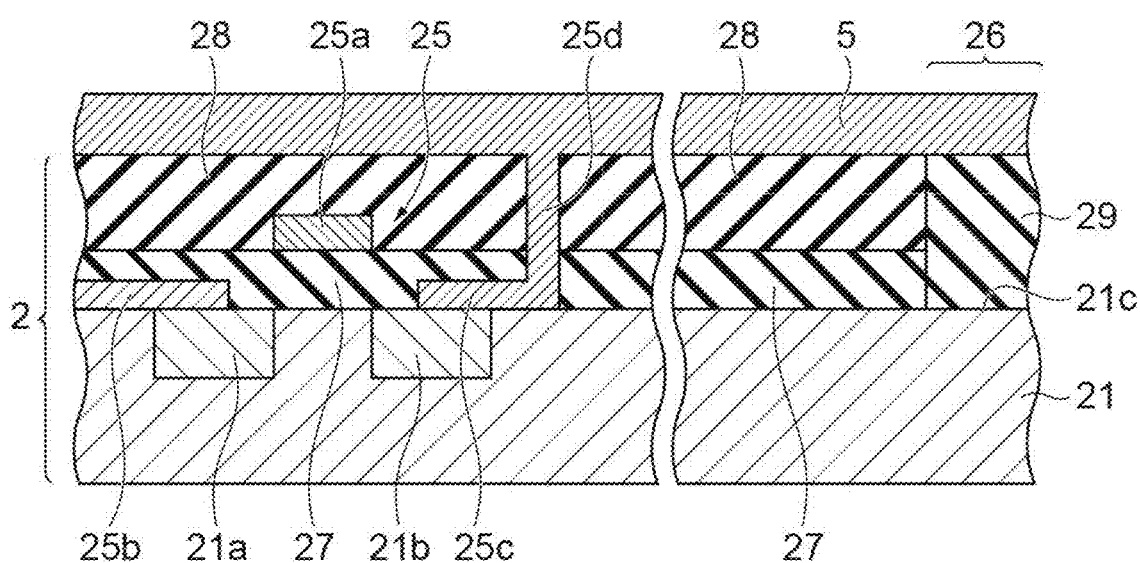
FIG. 8 is a cross-sectional view taken along line VIII-VIII in FIG. 7, showing a cross-sectional structure of the drive circuit 2 in each pixel 10.

FIG. 7 is a plan view showing a structure of the drive circuit 2 in each pixel 10. FIG. 8 is a cross-sectional view taken along line VIII-VIII in FIG. 7, showing a cross-sectional structure of the drive circuit 2 in each pixel 10. As illustrated in FIG. 8, the drive circuit 2 includes a semiconductor layer 21 of a first conductivity type (for example, p-type) and insulating layers 27 and 28 disposed on the semiconductor layer 21. The semiconductor layer 21 may be a semiconductor substrate itself, or may be a semiconductor film (a monocrystalline film, a polycrystalline film, or an amorphous film) formed on a heterogeneous substrate. The transistor 25 is disposed on the front surface 21c (that is, the main surface of the semiconductor substrate or the main surface of the substrate-like member including a heterogeneous substrate and a semiconductor film) of the semiconductor layer 21. In a case where the semiconductor layer 21 is a semiconductor film formed on a heterogeneous substrate, the transistor 25 is called a thin-film transistor. The semiconductor substrate that forms the semiconductor layer 21 or the heterogeneous substrate and the semiconductor film that forms the semiconductor layer 21 are integrated with the stacked structure 7 while causing the front surface 21c and the rear surface 7b of the stacked structure 7 (see FIG. 3) to be opposed to each other.

In one example, the semiconductor layer 21 mainly includes Si with a dopant for the first conductivity type (for example, p-type) doped thereto. In the semiconductor layer 21, semiconductor regions 21a and 21b of a second conductivity type (for example, n-type) are formed. The semiconductor regions 21a and 21b mainly include Si with a dopant for the second conductivity type doped thereto. The semiconductor regions 21a and 21b are spaced apart from each other and exposed on the front surface 21c of the semiconductor layer 21. The semiconductor region 21a is in ohmic contact with a source electrode 25b of the transistor 25 disposed on the front surface 21c. The semiconductor region 21b is in ohmic contact with a drain electrode 25c of the transistor 25 disposed on the front surface 21c. The source electrode 25b and the drain electrode 25c are spaced apart and arranged side by side on the front surface 21c.

The region on the front surface 21c except the source electrode 25b and the drain electrode 25c is covered with the insulating layer 27. Note that FIG. 7 shows only necessary portions of the insulating layer 27 for ease of understanding. The insulating layer 27 mainly includes an insulative silicon compound such as $SiO_2$. On the insulating layer 27, a gate electrode 25a of the transistor 25 is disposed. The gate electrode 25a is opposed to, across the insulating layer 27, a region located between the semiconductor region 21a and the semiconductor region 21b in the semiconductor layer 21. The gate electrode 25a is covered with the insulating layer 28 provided on the insulating layer 27. As illustrated in FIG. 8, the insulating layer 28 is a protective film that protects the entire drive circuit 2. The insulating layer 28 mainly includes, for example, $SiO_2$. On the insulating layer 28, the metal film 5 of the corresponding pixel 10 is disposed.

As illustrated in FIG. 7, the source electrode 25b is connected to the voltage supply line 24 disposed on the front surface 21c. The gate electrode 25a is connected to the gate drive line 23 via a wiring provided on the insulating layer 27.

As illustrated in FIG. 8, the drain electrode 25c is connected to the metal film 5 via a wiring 25d passing through the insulating layers 27 and 28.

The capacitor 26 includes part of the metal film 5, the semiconductor layer 21 that is located directly under the metal film 5, and the dielectric layer 29 that is interposed therebetween. Note that the semiconductor layer 21 is regulated to a constant potential (for example, the reference potential). In this case, the metal film 5 also serves as one electrode of the capacitor 26, and the semiconductor layer 21 also serves as the other electrode of the capacitor 26. The dielectric layer 29 is disposed so as to fill the openings formed in the insulating layers 27 and 28. The bottom surface of the dielectric layer 29 is in contact with the semiconductor layer 21, and the top surface of the dielectric layer 29 is in contact with the metal film 5. The dielectric layer 29 mainly includes, for example, $SiO_2$.

Figure 9A:
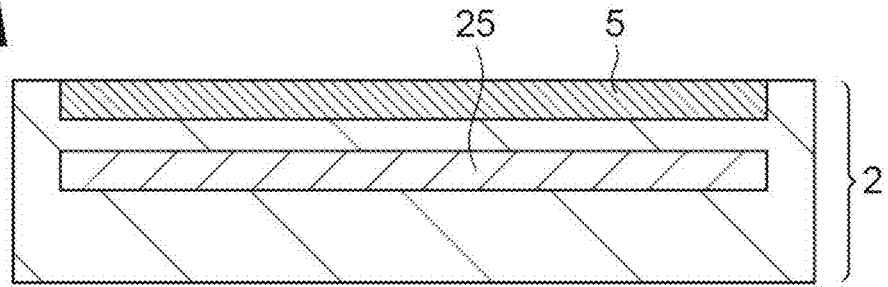
FIGS. 9A to 9D are cross-sectional views showing individual steps in an example of a method for producing the metasurface 1A including the drive circuit 2.

FIGS. 9A to 9D are cross-sectional views showing individual steps in an example of a method for producing the metasurface 1A including the drive circuit 2. Note that FIGS. 9A to 9D illustrate one pixel 10 as a representative, and other pixels 10 can be produced in parallel with the one pixel 10 in a similar manner. First, as illustrated in FIG. 9A, the drive circuit 2 is prepared in the first step. The drive circuit 2 is produced by a well-known method for forming a wiring layer on a substrate having a transistor. In this step, the metal film 5 is formed on the wiring layer on the drive circuit 2 by, for example, a physical layer deposition (PLD) method.

Figure 9B:
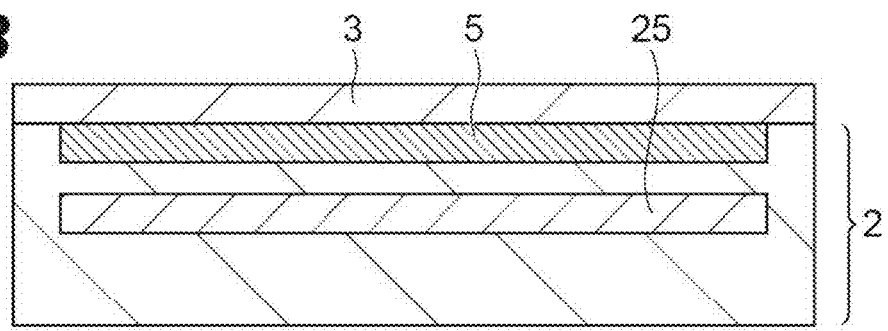

Next, as illustrated in FIG. 9B, the semiconductor layer 3 is formed on the metal film 5 by using a physical vapor deposition method such as a sputtering method or an atomic layer deposition (ALD) method. In the case of a sputtering method, a target including the material of the semiconductor layer 3 is placed in a vacuum chamber, an inert gas ionized by a high voltage is caused to collide with the target, and the material of the semiconductor layer 3 is scattered, thereby forming a film. If the semiconductor layer 3 is comprised of ITO, the material of the dielectric layer 4 is, for example, at least one of $SiO_2$, $Al_2O_3$, and $HfO_2$.

Figure 9C:
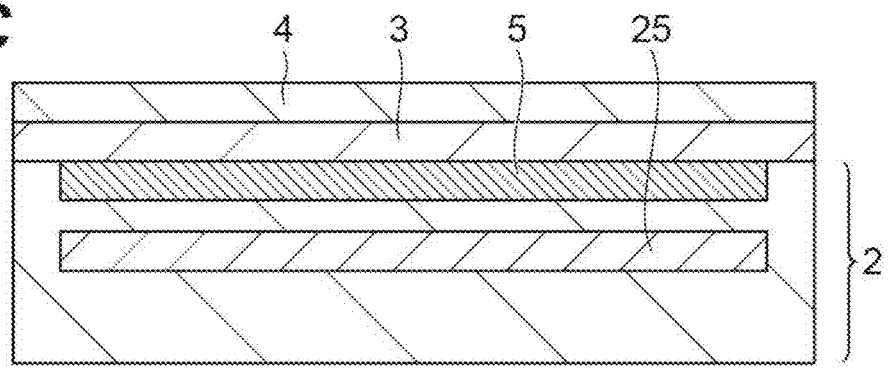

Subsequently, as illustrated in FIG. 9C, the dielectric layer 4 is formed on the semiconductor layer 3 by using, for example, an ALD method. Specifically, a raw material gas is introduced into, and purged from, the film forming apparatus for each element included in the dielectric layer 4, thereby repeatedly forming a film having a thickness on the order of several angstroms, for example. If the dielectric layer 4 is comprised of $SiO_2$, the ALD material is, for example, TDMAS and oxygen plasma.

Figure 9D:
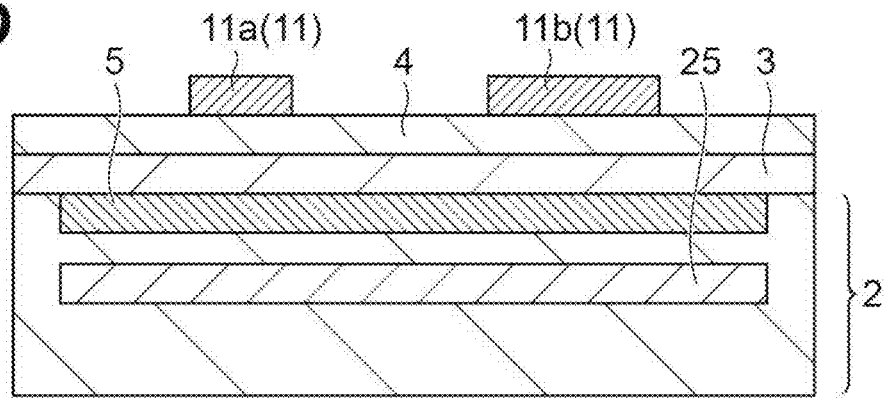

Subsequently, as illustrated in FIG. 9D, the metal film 11 including the partial films 11a and 11b is formed on the dielectric layer 4 by using, for example, a lift-off method. Specifically, first, a resist is applied onto the dielectric layer 4, and a plurality of openings corresponding to the partial films 11a and 11b is formed by electron-beam lithography. Next, a metal film (for example, an Au film) is vapor-deposited on the entire surface of the dielectric layer 4 including the plurality of openings in the resist. Then, the metal film deposited on the resist is removed by removing the resist. Through the steps described above, the metasurface 1A of the present embodiment is produced.

Effects provided by the above-described metasurface 1A of the present embodiment are described below. The metasurface 1A has an MIM structure in which the metal film 5 that serves as a light reflecting film, the stacked structure 7 that includes the semiconductor layer 3 and the dielectric layer 4, and the metal film 11 that includes the partial films 11a and 11b having finite widths Wa and Wb are stacked in the order mentioned. In this case, as illustrated in FIGS. 2 and 3, the stacked structure 7 in each sub-pixel 10a, 10b includes a pair of portions 71 and 72. The pair of portions 71 and 72 are disposed at a pair of positions sandwiching the partial film 11a, 11b as viewed from the stacking direction and are exposed from the metal film 11. The light L to be modulated is inputted from the outside of the metasurface 1A to one portion 71 (or 72) of each sub-pixel 10a, 10b, and is reflected by the metal film 5 and outputted from the other portion 72 (or 71) of each sub-pixel 10a, 10b to the outside of the metasurface 1A. At the same time, when a drive voltage Vd is applied between the partial film 11a, 11b and the metal film 5, induced currents in opposite directions called the gap-surface plasmon mode are generated on both the partial film 11a, 11b and the metal film 5, and strong magnetic resonance (plasmon resonance) is generated in the stacked structure 7. With this magnetic resonance, the phase of the light L to be modulated passing between the partial film 11a and the metal film 5 and the phase of the light L to be modulated passing between the partial film 11b and the metal film 5 are individually modulated.

Here, the following formula (1) represents the relationship among the amount of phase modulation φ of the light L to be modulated caused by magnetic resonance, the width w (=Wa or Wb) of the partial film 11a or 11b, the wavelength λ, of the light L to be modulated, and the effective refractive index $N_{gsp}$ of the stacked structure 7. Note that k is an integer.

$$w \frac{2\pi}{\lambda} N_{gsp} = k\pi - \varphi \quad (1)$$

As is obvious from the above formula (1), the amount of phase modulation φ is dependent on the effective refractive index $N_{gsp}$ of the stacked structure 7. The effective refractive index $N_{gsp}$ can be controlled by changing the drive voltage Vd applied between the partial film 11a, 11b and the metal film 5. Reasons therefor are as follows. When a drive voltage Vd is applied between the partial film 11a, 11b and the metal film 5, the electron density near the interface between the semiconductor layer 3 and the dielectric layer 4 is increased by the electric field between the partial film 11a, 11b and the metal film 5. As a result, a layered portion of the semiconductor layer 3 near the interface is metallized. Since the metallized layer reacts with the light L to be modulated, the effective refractive index $N_{gsp}$ of the stacked structure 7 is changed. Furthermore, in the metasurface 1A of the present embodiment, each of the metal films 5 is disposed for each pixel 10 and are separated from each other, and the drive circuit 2 individually controls the drive voltage Vd on the metal film 5 for each pixel 10. As a result, the thickness of the metallized layer in the semiconductor layer 3 can be independently controlled for each pixel 10, and thus the phase can be independently modulated for each pixel 10. That is, the metasurface 1A of the present embodiment makes it possible to modulate the phase for each of the M pixels 10 arrayed one-dimensionally.

In addition, as is obvious from the above formula (1), the amount of phase modulation φ is also dependent on the width w of the partial film 11a, 11b. Therefore, by making the widths Wa and Wb in the sub-pixels 10a and 10b different from each other, any initial phase difference can be set between the phase of a partial light beam outputted from the sub-pixel 10a and the phase of a partial light beam outputted from the sub-pixel 10b. Note that the initial phase refers to the phase of outgoing light (the partial light beam outputted from each sub-pixel) in a case where the drive voltage Vd on the metal film 5 is set to a certain initial value (0 V, for example).

Figure 10:
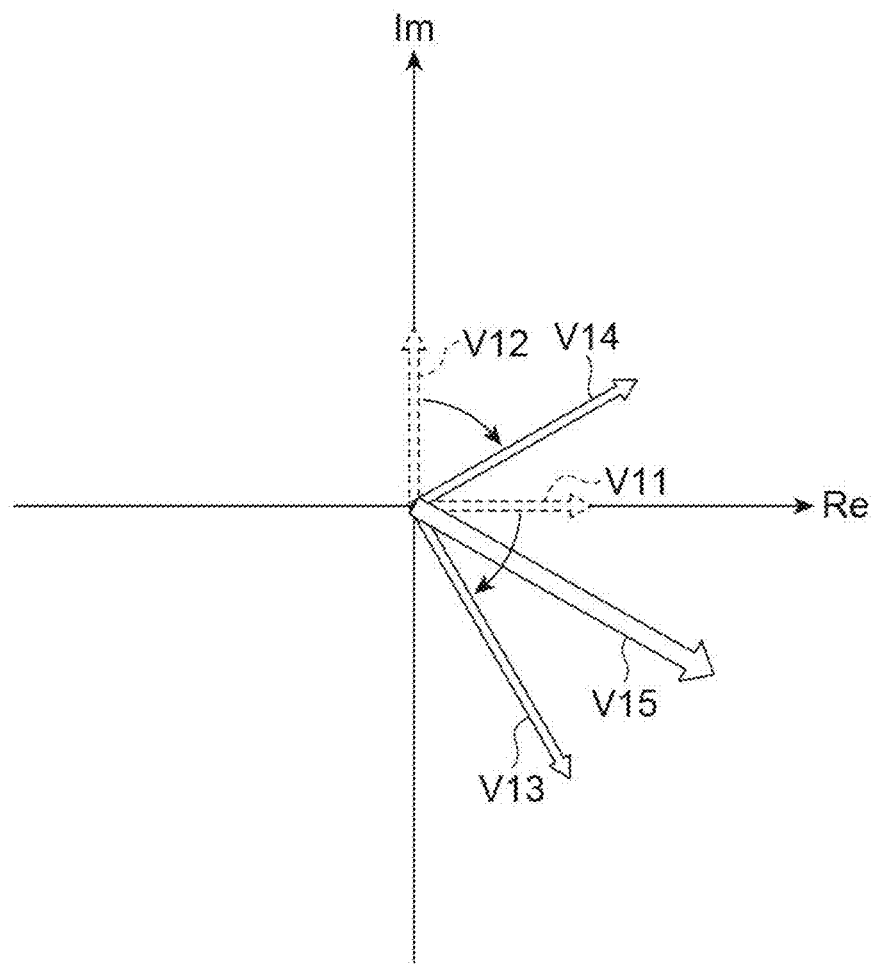
FIG. 10 is a graph showing a complex plane indicating phases and intensities of outgoing light.

FIG. 10 is a graph showing a complex plane indicating phases and intensities of outgoing light. In FIG. 10, the vertical axis represents an imaginary axis, and the horizontal axis represents a real axis. A plurality of vectors V11 to V15 are shown in the figure. The length of each vector represents the light intensity of outgoing light, and the angle around the origin represents the phase of outgoing light. The vector V11 shows, for example, an initial state of the sub-pixel 10a, *representing outgoing light having a phase of* 0 (rad). The vector V12 shows, for example, an initial state of the sub-pixel 10b, representing outgoing light having a phase of $\pi/2$ (rad). When a voltage is applied to the metal film 5, the phase of the sub-pixel 10a changes in accordance with the magnitude of the voltage (from the vector V11 to the vector V13), and at the same time, the phase of the sub-pixel 10b changes (from the vector V12 to the vector V14). At the same time, the magnitude of the vector, that is, the intensity of outgoing light also changes.

Note here that the vector V15 is a combined vector of the vector V13 and the vector V14. According to findings of the present inventors, in a case where the array pitch W1 of the pixel 10 including N sub-pixels is less than the wavelength of incident light and is constant along the array direction of the N sub-pixels, N partial light beams (each being outgoing light) outputted from the N sub-pixels are combined into light (one light beam) having a single phase and a uniform intensity in the far field. The single phase and the uniform intensity are not simply an average of N values but represent a value obtained by vector composition of the phases or the intensities of the individual N partial light beams. In this example, two partial light beams from two sub-pixels 10a and 10b are combined into light having a single phase and a uniform intensity in the far field. Its phase and intensity are represented by the vector V15.

Figure 11:
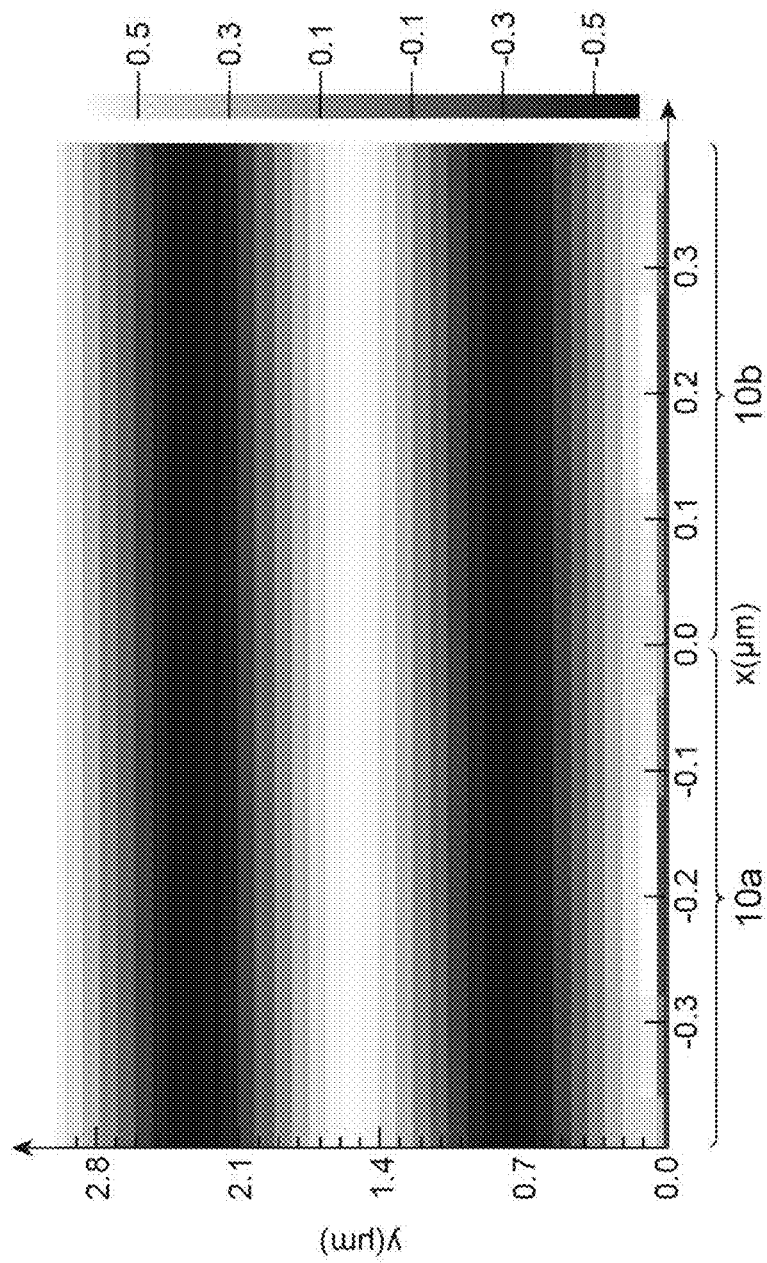
FIG. 11 is a graph obtained by simulating a state in which two partial light beams outputted from two sub-pixels 10a and 10b are combined, showing a case where the phase difference between the partial light beams from the sub-pixels 10a and 10b is $\pi/2$ (rad).
Figure 12:
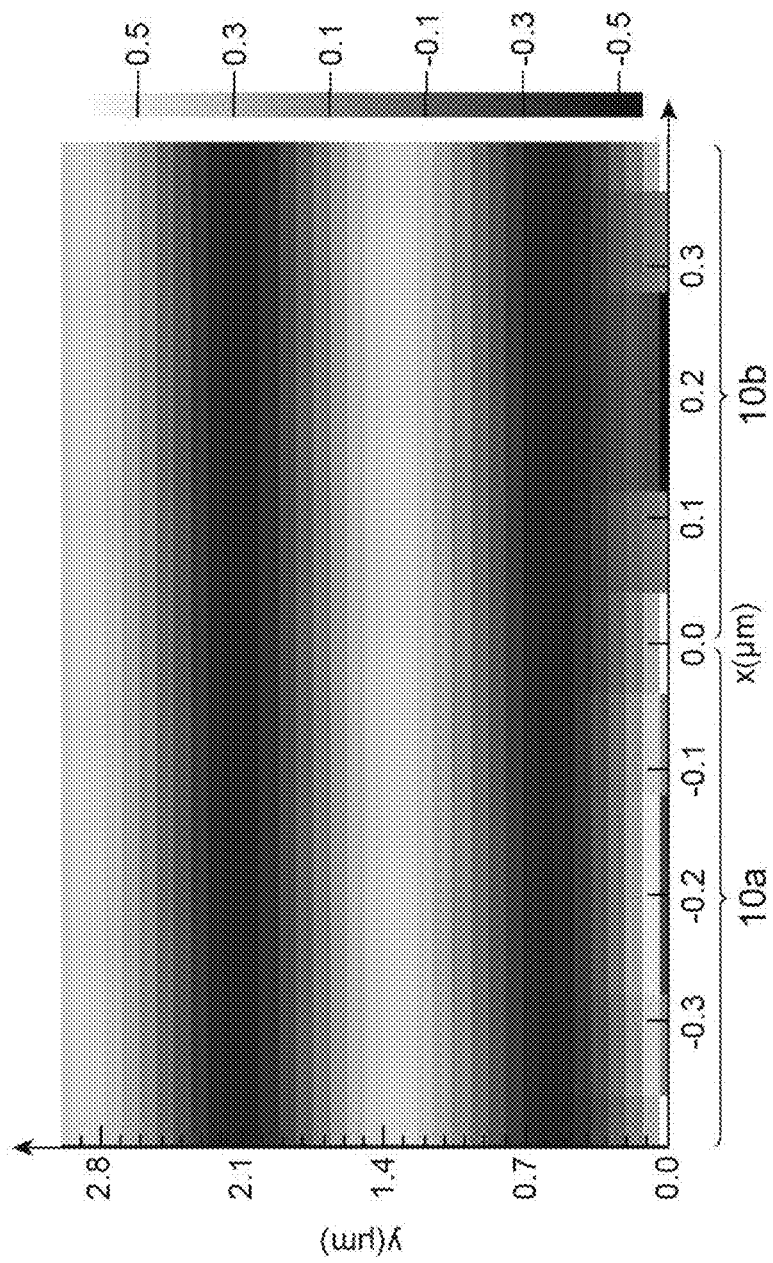
FIG. 12 is a graph obtained by simulating a state in which two partial light beams outputted from two sub-pixels 10a and 10b are combined, showing a case where the phase difference between the partial light beams from the sub-pixels 10a and 10b is 0 (rad).

FIGS. 11 and 12 are graphs obtained by simulating a state in which two partial light beams from two sub-pixels 10a and 10b are combined. In these figures, the vertical axis indicates a position y (unit: μm) along the normal direction with respect to the surface of the sub-pixel 10a, 10b, and the horizontal axis indicates a position x (unit: μm) along the direction D1. In addition, phases of outgoing light are expressed by shades of color. FIG. 11 illustrates a case where the phase difference of the light outputted from the sub-pixels 10a and 10b is $\pi/2$ (rad), and FIG. 12 illustrates a case where the phase difference of the light outputted from the sub-pixels 10a and 10b is 0 (rad). Detailed simulation conditions are as follows.

Wavelength of incident light: 1.55 μm
Array pitch of pixel 10: 800 nm
Array pitch of sub-pixel 10a, 10b: 400 nm
Light source size: 200 nm
Boundary conditions: direction D1 . . . boundary condition of pitch, normal direction to pixel surface . . . boundary condition of PML
(Perfectly Matched Layer)

As shown in FIG. 12, when the partial light beams outputted from the sub-pixels 10a and 10b are in the same phase, as a matter of course, combined light of a single phase propagates in the far field. On the other hand, as shown in FIG. 11, when the partial light beams outputted from the sub-pixels 10a and 10b are in different phases, the partial light beams have different phases in the near field but are turned into combined light having a single phase in the far field. Note that the far field herein refers to, for example, a distance ranging from about one wavelength to several wavelengths from the pixel surface. Such findings have been made by the present inventors by themselves.

Figure 13:
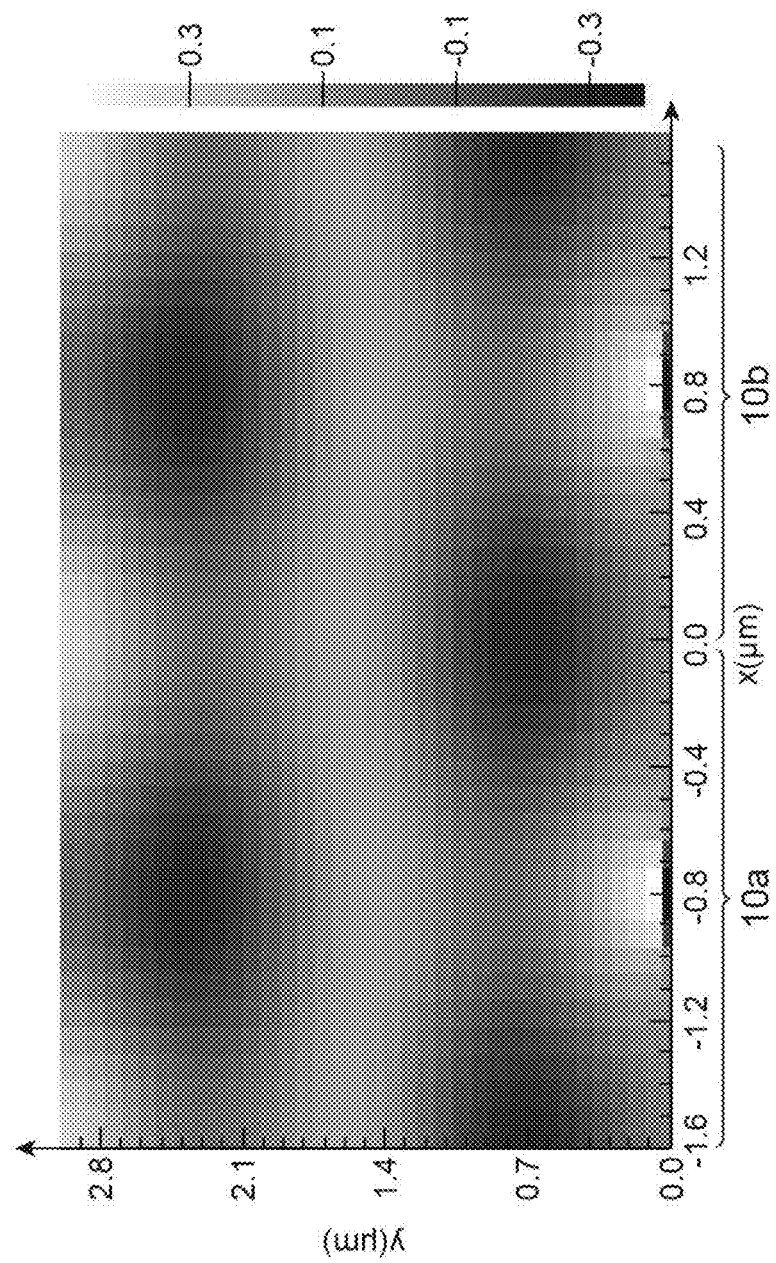
FIG. 13, which shows a comparative example, is a graph obtained by simulating a state in which the phase difference between partial light beams from sub-pixels 10a and 10b is 0 (rad) in a case where the array pitch of the pixel 10 is sufficiently greater than the wavelength of incident light.

FIG. 13, which shows a comparative example, is a graph obtained by simulating a state in which the phase difference between the partial light beams outputted from the sub-pixels 10a and 10b is 0 (rad) in a case where the array pitch of the pixel 10 is sufficiently greater than the wavelength of incident light. Detailed simulation conditions are as follows. As shown in FIG. 13, in this case, the light does not have a single phase even in the far field, only to generate diffracted light because partial light beams outputted from the sub-pixels 10a and 10b interfere with each other.

Wavelength of incident light: 1.55 μm
Array pitch of pixel 10: 3,200 nm
Array pitch of sub-pixel 10a, 10b: 1,600 nm
Light source size: 200 nm
Boundary conditions: direction D1 . . . boundary condition of pitch, normal direction to pixel surface . . . boundary condition of PML As described above, according to the present embodiment, it is made possible to achieve a desired phase value by appropriately controlling the phases of the sub-pixels 10a and 10b, even if the desired phase value cannot be attained by conventional pixel structures due to various restrictions. For example, if the phase modulation range of individual pixels 10 is $2\pi$ (rad), no limitation is imposed on phase values, and noise light included in outgoing light from the metasurface 1A can be reduced. In addition, although a conventional pixel structure may cause various light intensities depending on the pixels, the light intensities of the M pixels 10 can be made close to a uniform value by appropriately combining the phases of the sub-pixels 10a and 10b because light intensities of the sub-pixels 10a and 10b variously change with the change in phase. In this way, the metasurface 1A of the present embodiment makes it possible to provide a variable-phase device having a new device structure that can solve various problems. Note that such effects can also be provided in a case where the number N of sub-pixels is three or more.

As in the present embodiment, in each pixel 10, the widths Wa and Wb of the partial films 11a and 11b, respectively, may be different from each other, so that the initial phases of the sub-pixels 10a and 10b may be different from each other. For example, such configuration makes it possible expand the range of variable phases of each pixel 10. Specifically, for example, even if the range of phases that can be modulated by one pixel unit (or one pixel in the case of a conventional metasurface) is limited to $-\pi/2$ (rad) to $\pi/2$ (rad) by, for example, a structural factor or the like, phase modulation ranging from $-\pi$ (rad) to $\pi$ (rad), that is, phase modulation of a $2\pi$ (rad) width, is achieved by shifting the initial phases of the sub-pixels 10a and 10b by $\pi$ (rad). Therefore, the degree of freedom of phase modulation can be increased to an utmost limit in various applications such as lens applications and hologram formation. Note that such effects can also be provided in a case where the number N of sub-pixels is three or more. In particular, If the initial phases of N sub-pixels are shifted from each other by $2\pi/N$ (rad), it is made possible to achieve a significant phase change in each pixel 10 while maximizing the initial phase difference between sub-pixels and reducing the range of phase variation in each sub-pixel.

In the present embodiment, the voltage between the partial film 11a of the sub-pixel 10a and the metal film 5 and the voltage between the partial film 11b of the sub-pixel 10b and the metal film 5 are collectively controlled (to the same voltage) in each pixel 10. However, these voltages may be controlled independently of (separately from) each other by disposing the voltage supply line 24 and the transistor 25 in each of the sub-pixels 10a and 10b. In this case, the degree of freedom of variation in the phase and intensity of the light exiting each of the pixels 10 can be further increased.

First Modification

Figure 14:
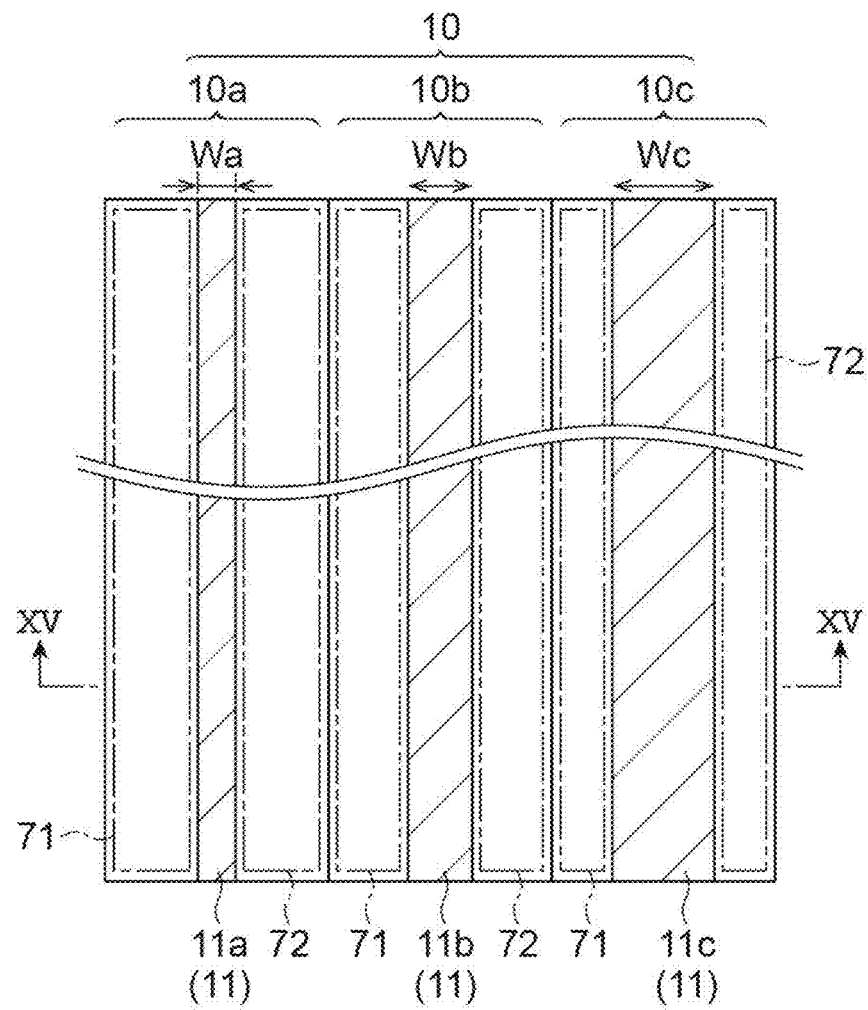
FIG. 14 is a plan view showing a case where the number N of sub-pixels included in one pixel 10 is three.
Figure 15:
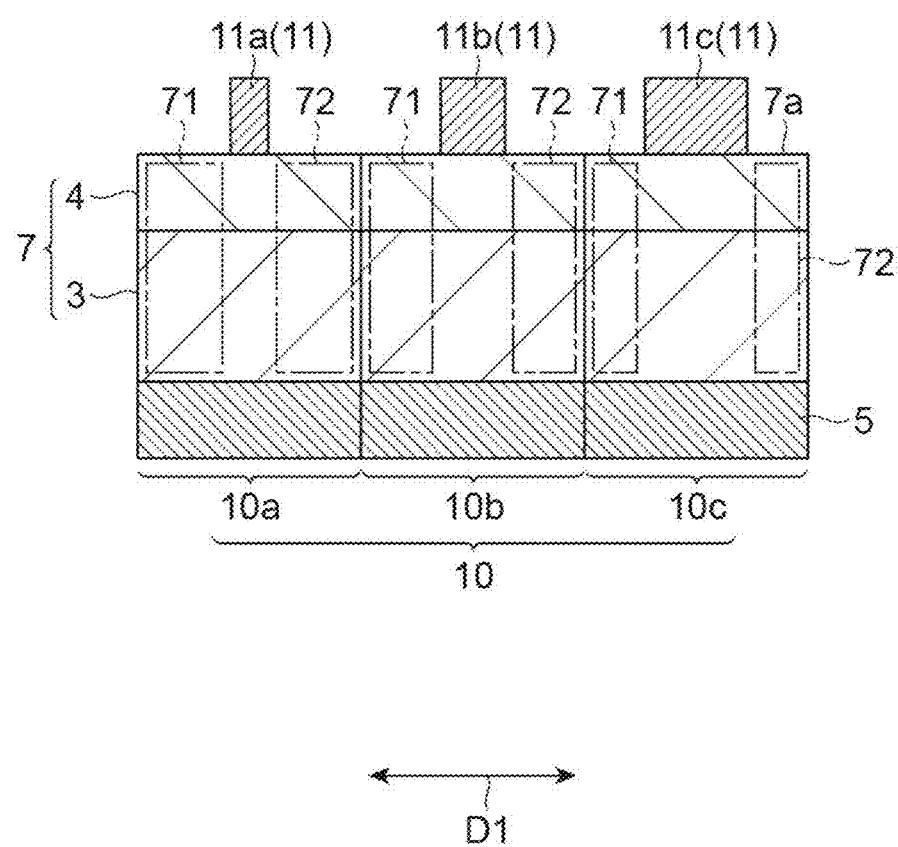
FIG. 15 is a cross-sectional view taken along line XV-XV shown in FIG. 14.

FIG. 14 is a plan view showing a case where the number N of sub-pixels included in one pixel 10 is three. FIG. 15 is a cross-sectional view taken along line XV-XV shown in FIG. 14. The pixel 10 shown in these figures includes three sub-pixels 10a to 10c. Each of the sub-pixels 10a to 10c has a structure for changing the phase of incident light. The sub-pixels 10a to 10c are arranged in a line along the array direction of the pixels 10 (the direction D1). The widths of the sub-pixels 10a to 10c defined along the array direction are equal to each other. The array pitch of the sub-pixel 10a to 10c is constant.

The metal film 11 includes a partial film 11a disposed on the stacked structure 7 of the sub-pixel 10a, a partial film 11b disposed on the stacked structure 7 of the sub-pixel 10b, and a partial film 11c disposed on the stacked structure 7 of the sub-pixel 10c. As illustrated in FIG. 14, the partial films 11a to 11c are arranged along the direction D1 and separated from each other. The center positions of the partial films 11a to 11c with respect to the direction D1 coincide with the center positions of the sub-pixels 10a to 10c, respectively, with respect to the same direction. The widths Wa to Wc of the partial films 11a to 11c with respect to the direction D1 are set to be smaller than the width of the sub-pixels 10a to 10c with respect to the same direction, and to be sufficiently smaller than the wavelength of the light L to be modulated. In addition, the widths Wa to Wc are different from each other. In the illustrated example, the width Wa of the partial film 11a of the sub-pixel 10a located at one end with respect to the direction D1 is the smallest, and the width of the partial film becomes larger toward the sub-pixel 10c located at the other end with respect to the direction D1. The widths Wa to Wc of the partial films 11a to 11c fall within the range of 100 to 300 nm, and in one example, Wa=220 nm, Wb=240 nm, and Wc=260 nm.

As described above, the widths Wa to Wc of the partial films 11a to 11c are smaller than the widths of the sub-pixels 10a to 10c, respectively. In addition, the partial films 11a to 11c are placed substantially at the centers of the sub-pixels 10a to 10c, respectively, with respect to the direction D1. Accordingly, as shown in FIGS. 14 and 15, the stacked structure 7 includes a pair of portions 71 and 72 in each of the sub-pixels 10a to 10c. The pair of portions 71 and 72 are disposed at a pair of positions sandwiching the partial film 11a (11b or 11c) as viewed from the thickness direction of the stacked structure 7, and are exposed from the metal film 11. The array direction (that is, the direction D1) of the pair of portions 71 and 72 coincides with the polarization direction of the light L to be modulated.

Figure 16:
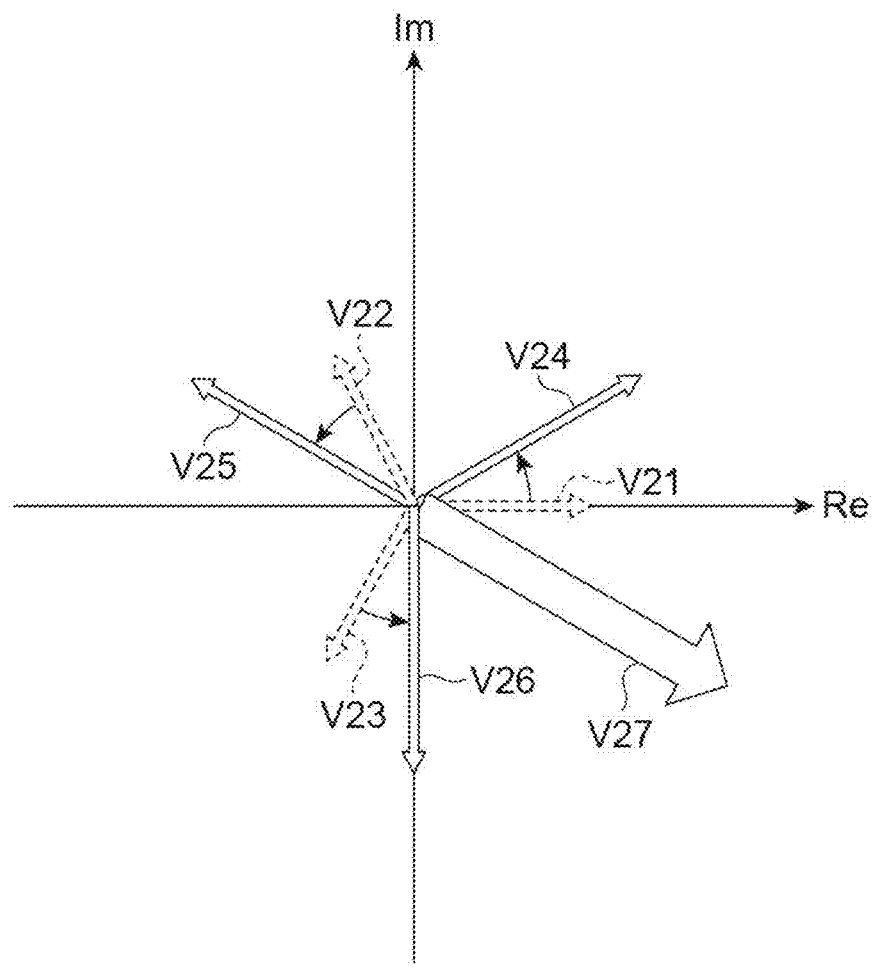
FIG. 16 is a graph showing a complex plane indicating phases and intensities of outgoing light.

FIG. 16 is a graph showing a complex plane indicating phases and intensities of outgoing light. A plurality of vectors V21 to V27 are shown in the figure. As in FIG. 10 described above, the length of each vector is equivalent to the light intensity of outgoing light, and the angle around the origin is equivalent to the phase of outgoing light. The vector V21 shows, for example, an initial state of the sub-pixel 10a, representing outgoing light having a phase of 0 (rad). The vector V22 shows, for example, an initial state of the sub-pixel 10b, representing outgoing light having a phase of 2π/3 (rad). The vector V23 shows, for example, an initial state of the sub-pixel 10c, representing outgoing light having a phase of 4π/3 (rad). When a voltage is applied to the metal film 5, the phases of the sub-pixels 10a to 10c change in accordance with the magnitude of the voltage. That is, the vector V21 changes to the vector V24, the vector V22 changes to the vector V25, and the vector V23 changes to the vector V26.

Note here that the vector V27 is a combined vector of the vectors V24 to V26. As described in the embodiment above, in a case where the array pitch of the pixel 10 including the sub-pixels 10a to 10c is less than the wavelength of incident light and is constant along the array direction of the sub-pixels 10a to 10c, three partial light beams from the sub-pixels 10a to 10c are combined into light (one light beam) having a single phase and a uniform intensity in the far field. Therefore, according to the present modification, it is also made possible to achieve a desired phase value by appropriately controlling the phases of the sub-pixels 10a to 10c, even if the desired phase value cannot be attained by conventional pixel structures due to various restrictions. In addition, the light intensities of the M pixels 10 can be made close to a uniform value by appropriately combining the phases of the sub-pixels 10a to 10c because light intensities of the sub-pixels 10a to 10c variously change with the change in phase.

As in the present modification, in each pixel 10, the widths Wa to Wc of the partial films 11a to 11c, respectively, may be different from each other, so that the initial phases of the sub-pixels 10a to 10c may be different from each other. For example, such configuration makes it possible expand the range of variable phases of each pixel 10. Specifically, for example, even if the range of phases that can be modulated by one pixel unit (or one pixel in the case of a conventional metasurface) is limited to −π/3 (rad) to π/3 (rad) by, for example, a structural factor or the like, phase modulation ranging from −π (rad) to π (rad), that is, phase modulation of a 2π (rad) width, is achieved by shifting the initial phases of the sub-pixels 10a to 10c from each other by 2π/3 (rad). Therefore, the degree of freedom of phase modulation can be increased to an utmost limit in various applications such as lens applications and hologram formation. Furthermore, in this case, If the initial phases of the sub-pixels 10a to 10c are shifted from each other by 2π/3 (rad), it is made possible to achieve a significant phase change in each pixel 10 while maximizing the initial phase difference among the sub-pixels 10a to 10c and reducing the range of phase variation in each of the sub-pixels 10a to 10c.

Second Modification

Figure 17:
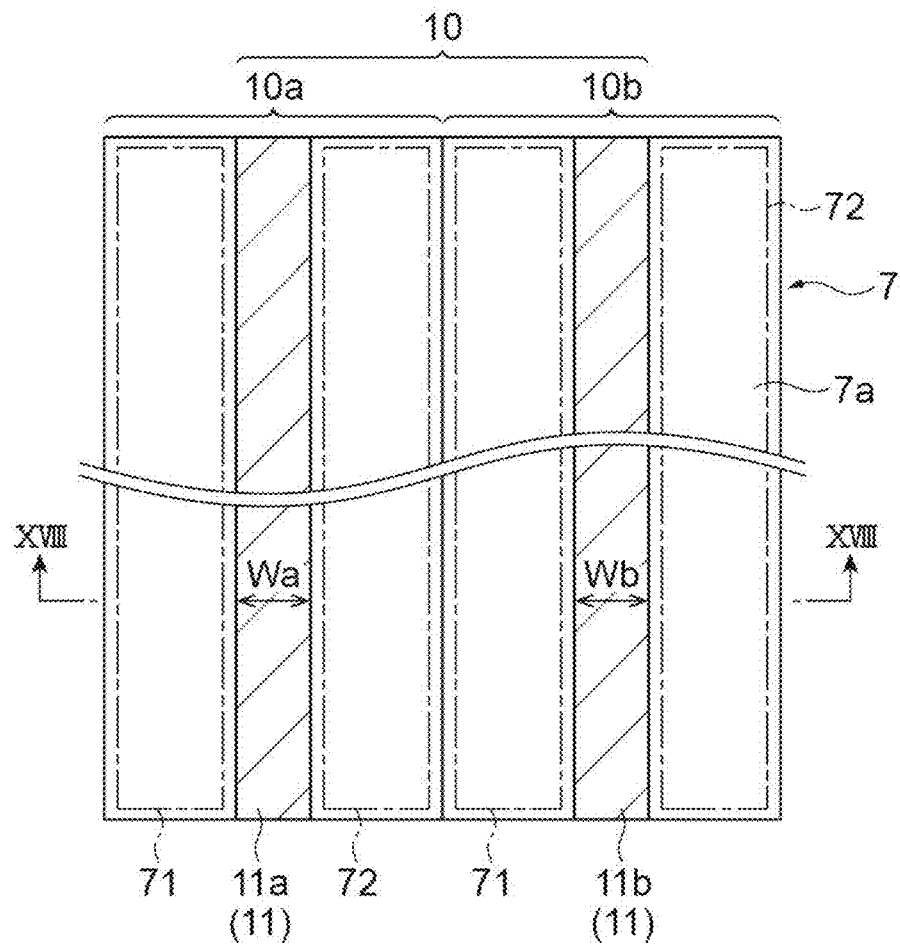
FIG. 17 is a plan view showing a case where the widths Wa and Wb of partial films 11a and 11b are equal to each other.
Figure 18:
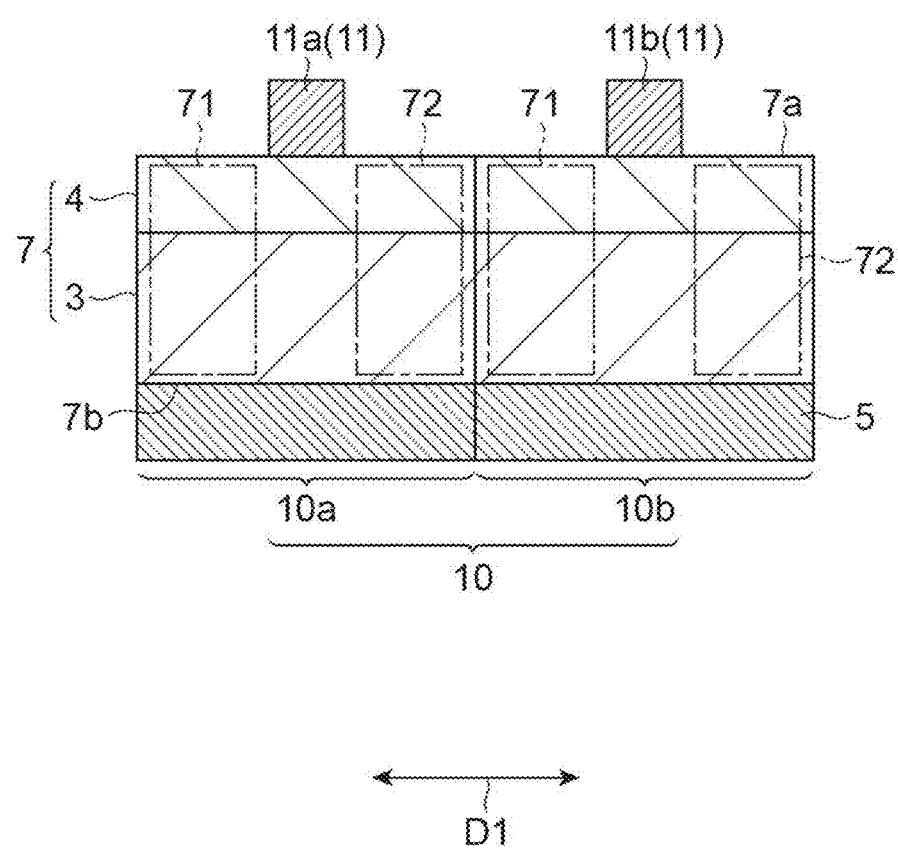
FIG. 18 is a cross-sectional view taken along line XVIII-XVIII shown in FIG. 17.

FIG. 17 is a plan view showing a case where the widths Wa and Wb of the partial films 11a and 11b of the above embodiment are equal to each other. FIG. 18 is a cross-sectional view taken along line XVIII-XVIII shown in FIG. 17. Even when the widths Wa and Wb are equal to each other as seen in the figures, the phases of the partial light beams individually outputted from the sub-pixels 10a and 10b can be made different from each other by performing control so that the voltages on the partial films 11a and 11b are of different values. Therefore, as in the above embodiment, it is made possible to achieve a desired phase value by appropriately controlling the phases of the sub-pixels 10a and 10b, even if the desired phase value cannot be attained by conventional pixel structures due to various restrictions.

In addition, the light intensities of the M pixels 10 can be made close to a uniform value by appropriately combining the phases of the sub-pixels 10a and 10b. The same applies to a case where the number N of sub-pixels is three or more.

Third Modification

Figure 19:
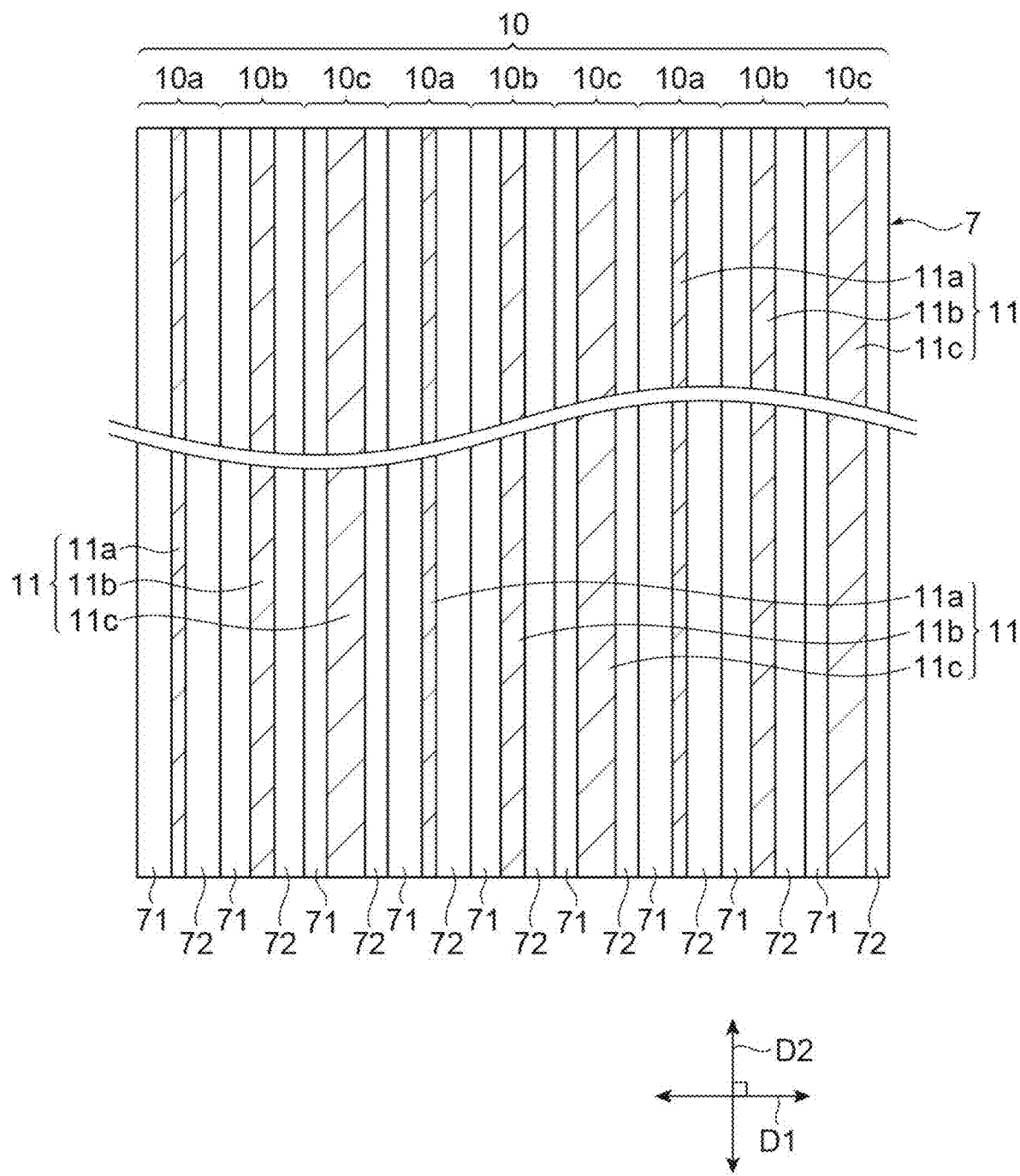
FIG. 19 is a plan view showing the pixel 10 in which $N_1$ sub-pixels including a metal film 11 that includes partial films whose widths are different from each other are repeatedly disposed in $N_2$ cycles (where $N_1$ and $N_2$ are each an integer of 2 or more).

FIG. 19 is a plan view showing the pixel 10 in which $N_1$ sub-pixels including a metal film 11 that includes partial films whose widths are different from each other are repeatedly disposed in $N_2$ cycles (where $N_1$ and $N_2$ are each an integer of 2 or more). In this case, the pixel 10 includes ($N_1 \times N_2$) sub-pixels. FIG. 19 illustrates the case where three sub-pixels 10a to 10c including partial films 11a to 11c whose widths are different from each other are disposed in three cycles, that is, the case where $N_1=3$ and $N_2=3$. In the case of this example, the effects similar to those of the above embodiment can still be provided.

Fourth Modification

Figure 20:
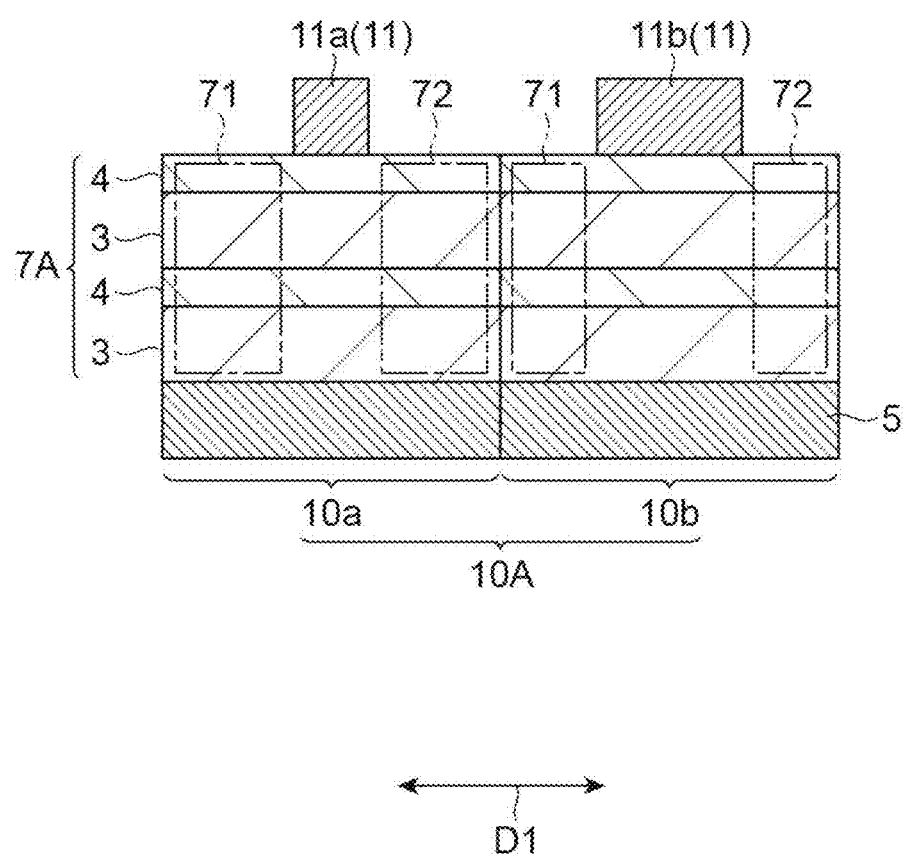
FIG. 20 is a diagram illustrating a cross-sectional structure of a pixel 10A according to a fourth modification.

FIG. 20 is a diagram illustrating a cross-sectional structure of a pixel 10A according to a fourth modification of the above embodiment. The present modification is different from the above embodiment in the configuration of the stacked structure. While the stacked structure 7 of the above embodiment includes a single semiconductor layer 3 and a single dielectric layer 4, the stacked structure 7A of the present modification has a configuration in which two semiconductor layers 3 and two dielectric layers 4 are alternately stacked. Specifically, the semiconductor layer 3 is disposed on the metal film 5, the dielectric layer 4 is disposed on the semiconductor layer 3, another semiconductor layer 3 is disposed on the dielectric layer 4, and another dielectric layer 4 is disposed on such another semiconductor layer 3. The metal film 11 is disposed on such another dielectric layer 4.

As in the present modification, in the stacked structure, a plurality of pairs of the semiconductor layer 3 and the dielectric layer 4 may be repeatedly stacked. In this case, while the phase modulation range of the individual sub-pixels 10a and 10b may be limited by a single pair, the phase modulation range of the individual sub-pixels 10a and 10b can be expanded by stacking a plurality of pairs. According to findings made by the present inventors, the phase modulation range is limited to $5/3\pi$ (rad) by a single pair, but the phase modulation range can be expanded to $2\pi$ (rad) by stacking a plurality of pairs.

Fifth Modification

Figure 21:
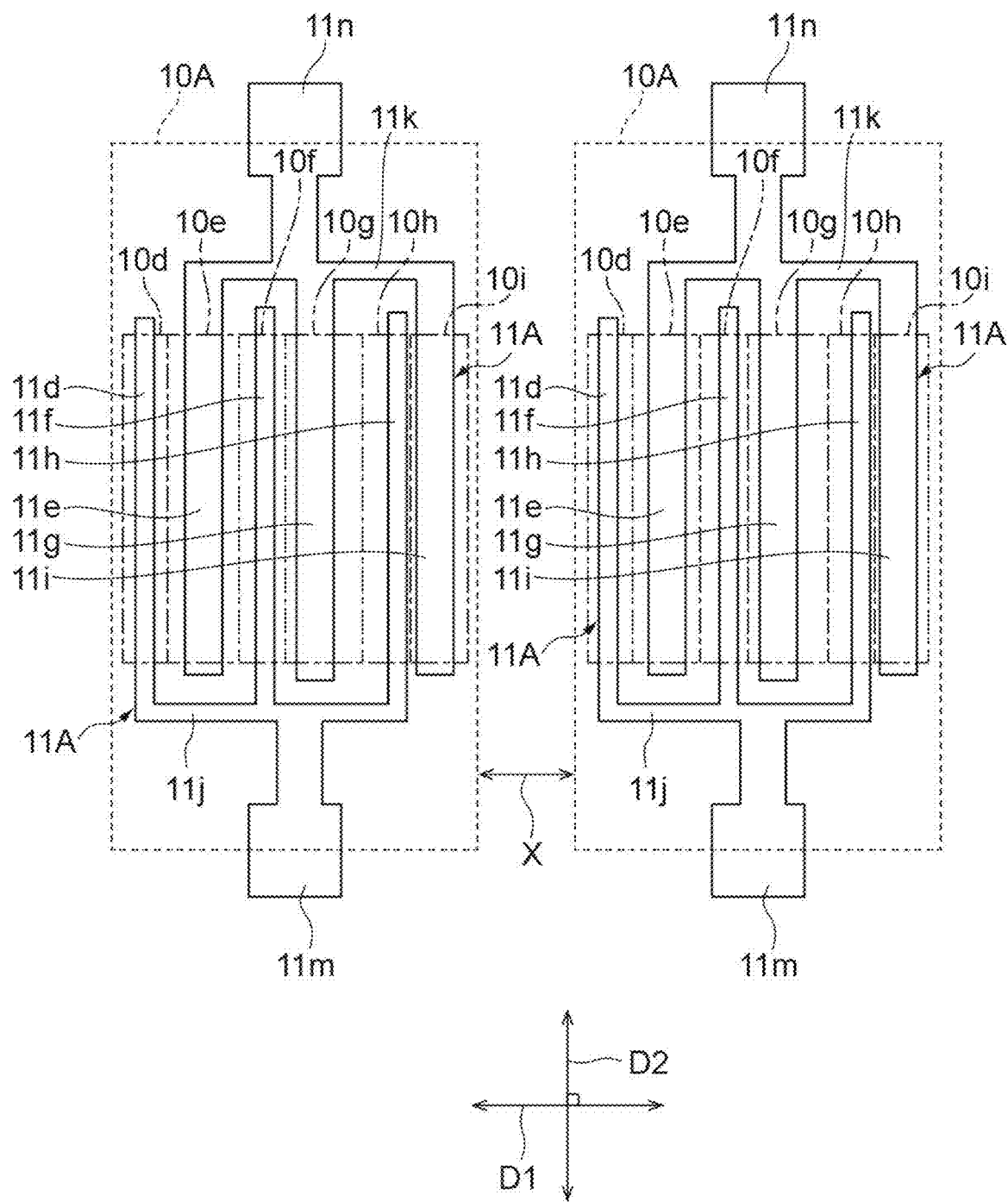
FIG. 21 is a plan view showing the shape of the metal film 11 as a fifth modification.
Figure 22:
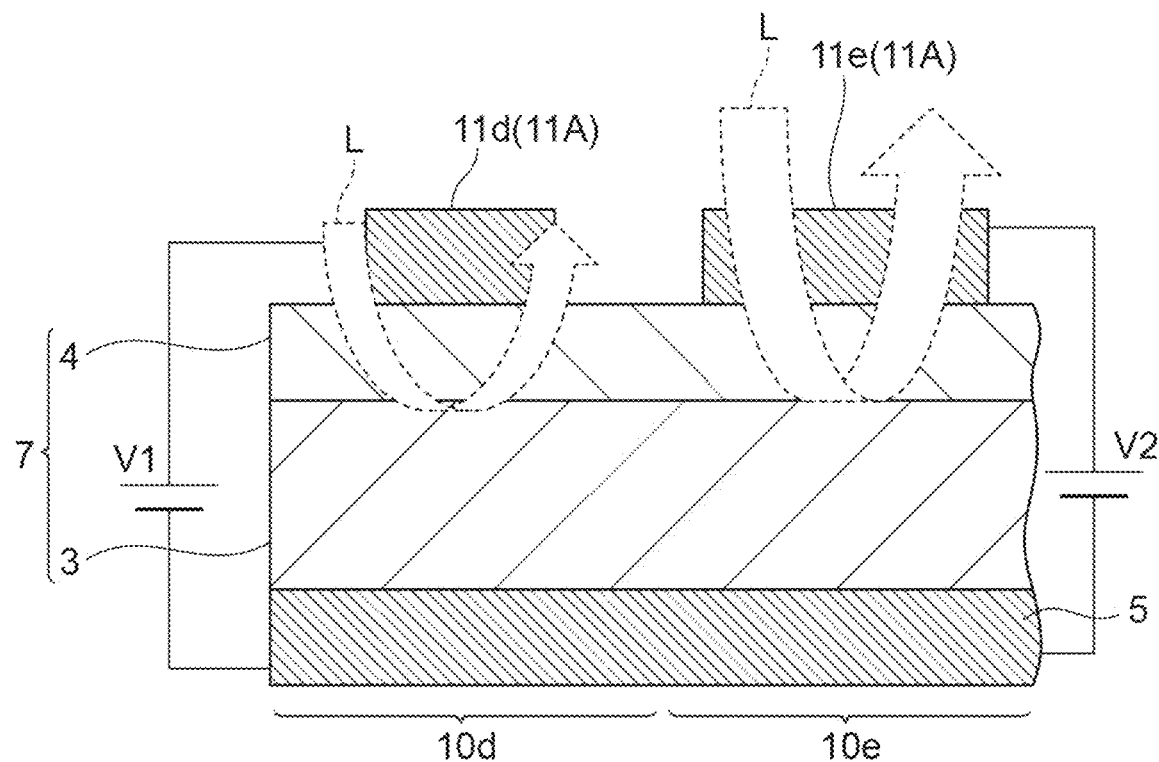
FIG. 22 is an enlarged cross-sectional view of two sub-pixels 10d and 10e adjacent to each other.

FIG. 21 is a plan view showing the shape of the metal film 11 as a fifth modification of the above embodiment. In the present modification, six sub-pixels 10d to 10i are provided in each pixel 10A. FIG. 22 is an enlarged cross-sectional view of two sub-pixels 10d and 10e adjacent to each other. The sub-pixels 10d to 10i are arranged in the order mentioned along the direction D1, and each of the sub-pixels extends along its longitudinal direction that coincides with the direction D2. Each of the sub-pixels 10d to 10i is provided with the individual partial films 11d to 11i of the metal film 11A. The wavelength of the light L to be modulated is, for example, 1,550 nm. In this case, the width of each of the sub-pixels 10d to 10i with respect to the direction D1 is smaller than the wavelength of the light L to be modulated, and may be, for example, 800 nm. A space X is provided between adjacent pixels 10A.

The metal film 11A is a first metal film disposed on the stacked structure 7. The metal film 11A has the same configuration as the configuration of the above-described metal film 11 except the following specifics. That is, the metal film 11A of the present modification further includes a pair of partial films 11j and 11k and pad portions 11m and 11n. The partial film 11j is disposed on one side of the sub-pixels 10d to 10i with respect to the direction D2, extends along the direction D1, and is integrally joined to the partial films 11d, 11f, and 11h. The pad portion 11m is disposed on the partial film 11j on the side opposite to the sub-pixels 10d to 10i, is integrally joined to the partial film 11j, and is electrically connected to the drive circuit 2 via, for example, a bonding wire. Therefore, a common variable voltage V1 (see FIG. 2) is applied to the partial films 11d, 11f, and 11h.

The partial film 11k is disposed on the other side of the sub-pixels 10d to 10i with respect to the direction D2, extends along the direction D1, and is integrally joined to the partial films 11e, 11g, and 11i. The pad portion 11n is disposed on the partial film 11k on the side opposite to the sub-pixels 10d to 10i, is integrally joined to the partial film 11k, and is electrically connected to the drive circuit 2 via, for example, a bonding wire. Therefore, a common variable voltage V2 (see FIG. 2) is applied to the partial films 11e, 11g, and 11i.

The widths of the partial films 11d, 11f, and 11h defined along the direction D1 are equal to each other. Likewise, the widths of the partial films 11e, 11g, and 11i defined along the direction D1 are also equal to each other. The width of each of the partial films 11d, 11f, and 11h is different from the width of each of the partial films 11e, 11g, and 11i. In the illustrated example, the width of each of the partial films 11e, 11g, and 11i is larger than the width of each of the partial films 11d, 11f, and 11h. The distance between centers of adjacent partial films is ½ of the width of the sub-pixel. If the width of each of the sub-pixels 10d to 10i is 800 nm, the distance between centers of adjacent partial films is 400 nm.

As in the present modification, a common voltage V1 may be applied to the partial films 11d, 11f, and 11h of some of a plurality of sub-pixels 10d to 10i included in one pixel 10A, namely the sub-pixels 10d, 10f, and 10h, while another common voltage V2 may be applied to the partial films 11e, 11g, and 11i of the other sub-pixels 10e, 10g, and 10i. In this case, the effects similar to those of the above embodiment can still be provided. In particular, as in the present modification, the partial films 11d, 11f, and 11h to which the voltage V1 is applied and the partial films 11e, 11g, and 11i to which the voltage V2 is applied may be alternately disposed.

Sixth Modification

Figure 23:
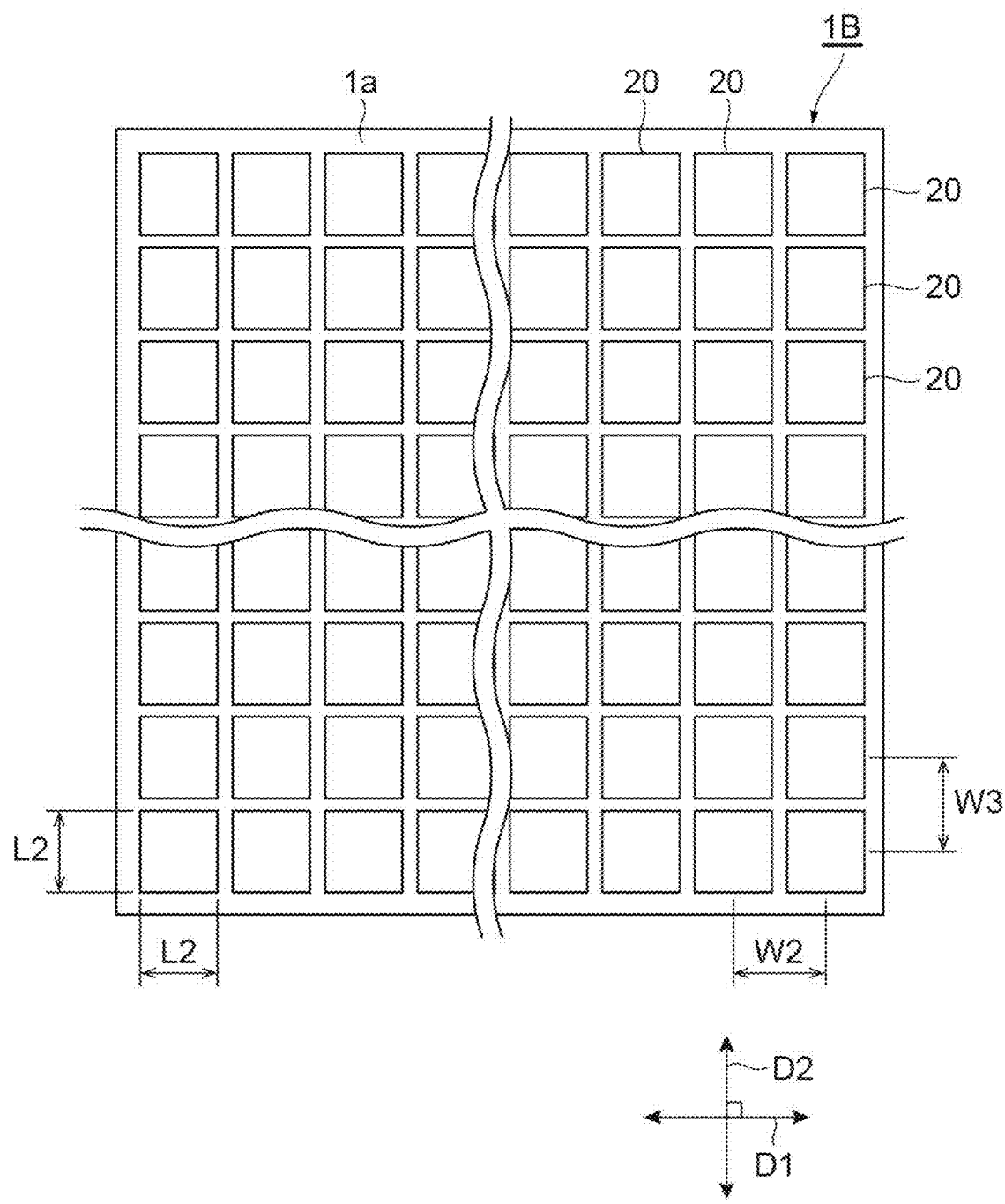
FIG. 23 is a plan view showing a metasurface 1B as a sixth modification.

FIG. 23 is a plan view showing a metasurface 1B as a sixth modification of the above embodiment. On the main surface 1a of the metasurface 1B, M pixels 20 are formed instead of the M pixels 10 in the above embodiment. The M pixels 20 are two-dimensionally arrayed in $M_1$ rows by $M_2$ columns, where the row direction is along the direction D1 and the column direction is along the direction D2. Note that $M_1$ and $M_2$ are each an integer of 2 or more and $M_1 \times M_2 = M$. The planar shape of each pixel 20 is rectangular (for example, square). The length L2 of one side of each pixel 20 falls within the range of, for example, 200 to 400 nm.

The array pitch (the distance between centers of adjacent pixels 20 defined along the direction D1) W2 of the pixels 20 along the column direction is less than the wavelength of incident light and is constant along the array direction of the $M_2$ pixels 20. Likewise, the array pitch (the distance between centers of adjacent pixels 20 defined along the direction D2) W3 of the pixels 20 along the row direction is less than the wavelength of incident light and is constant along the array direction of the $M_1$ pixels 20. Note that specific values of the wavelength of incident light and the array pitches W2 and W3 are similar to the values of the wavelength of incident light and the array pitch W1 of the above embodiment. The metasurface 1B is used for various purposes including lens applications and hologram formation by individually modulating, for each pixel 20, the phase of the light inputted to the main surface la (the light to be modulated that is incident light).

Figure 24:
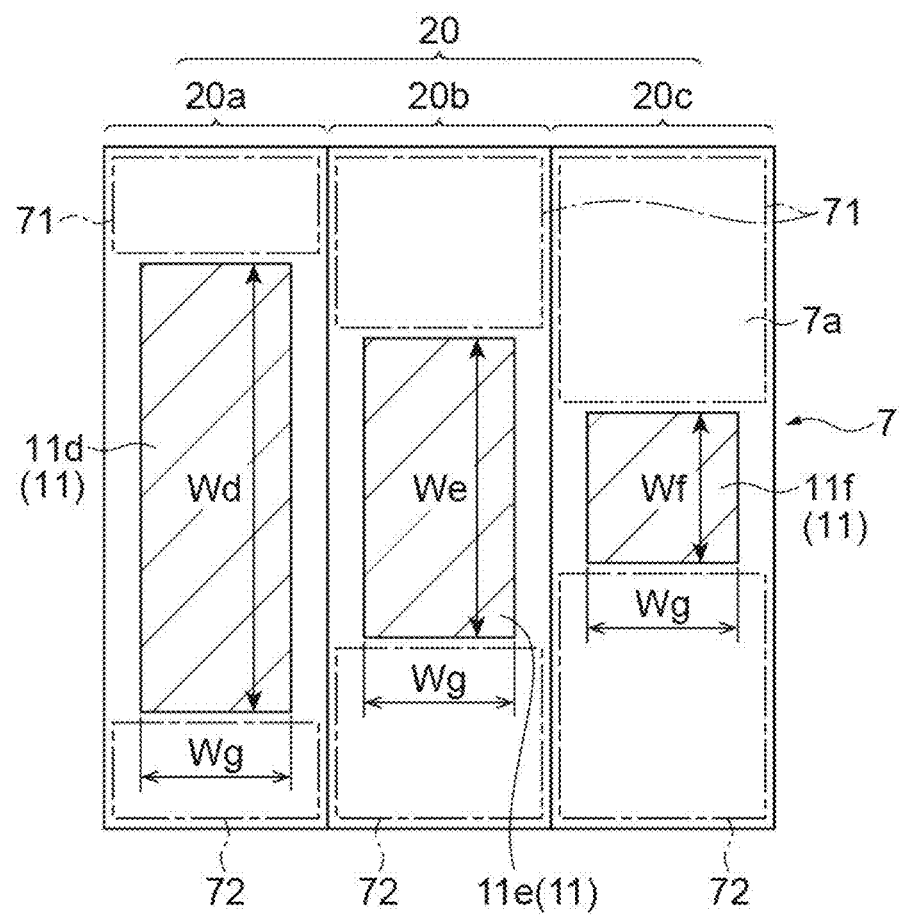
FIG. 24 is an enlarged plan view of one pixel 20.
Figure 24:
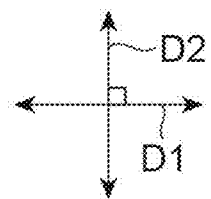

FIG. 24 is an enlarged plan view of one pixel 20. As illustrated in FIG. 24, each pixel 20 includes N sub-pixels 20a to 20c (where N is an integer of 2 or more; the figure shows the case of N=3). As in the above description, the number N of sub-pixels may be the same as, or different from, the number M of pixels 20 in the present modification. Each of the sub-pixels 20a to 20c has a structure for changing the phase of incident light. The sub-pixels 20a to 20c are arranged in a line along one of the array directions of the pixels 20 (the direction D1 in the present embodiment). The widths of the sub-pixels 20a to 20c defined along the array direction are equal to each other. The array pitch of the sub-pixels 20a to 20c (the distance between centers of adjacent sub-pixels along the direction D1) is constant along the array direction of the sub-pixels 20a to 20c.

The metal film 11 of the present modification includes a partial film 11d disposed on the stacked structure 7 of the sub-pixel 20a, a partial film 11e disposed on the stacked structure 7 of the sub-pixel 20b, and a partial film 11f disposed on the stacked structure 7 of the sub-pixel 20c. The partial films 11d to 11f are arranged along the direction D1 and separated from each other. The center positions of the partial films 11d to 11f as located along the directions D1 and D2 coincide with the center positions of the sub-pixels 20a to 20c also located along the directions D1 and D2. The width Wg of each of the partial films 11d to 11f defined along the direction D1 is set to be smaller than the width of each of the sub-pixels 20a to 20c defined along the same direction D1, and to be sufficiently smaller than the wavelength of the light L to be modulated. Likewise, the widths Wd to Wf of the partial films 11d to 11f defined along the direction D2 is set to be smaller than the width of each of the sub-pixels 20a to 20c defined along the same direction D2, and to be sufficiently smaller than the wavelength of the light L to be modulated. In addition, the widths Wd to Wf are different from each other. In the illustrated example, the width Wd of the partial film 11d of the sub-pixel 20a located at one end with respect to the direction D1 is the smallest, and the width of the partial film becomes smaller toward the sub-pixel 20c located at the other end with respect to the direction D1. The widths Wd to Wf of the partial films 11d to 11f fall within the range of 50 to 400 nm, and in one example, Wd=160 nm, We=240 nm, and Wf=320 nm.

As described above, the widths Wd to Wf of the partial films 11d to 11f defined along the direction D2 are smaller than the widths of the sub-pixels 20a to 20c, respectively, as defined along the direction D2. In addition, the partial films 11d to 11f are placed substantially at the centers of the sub-pixels 20a to 20c, respectively, as located along the direction D2. Accordingly, the stacked structure 7 includes a pair of portions 71 and 72 in each of the sub-pixels 20a to 20c. The pair of portions 71 and 72 are disposed at a pair of positions sandwiching the partial film 11d (11e or 11f) as viewed from the thickness direction of the stacked structure 7, and are exposed from the metal film 11. The array direction (that is, the direction D2) of the pair of portions 71 and 72 coincides with the polarization direction of the light L to be modulated.

Note that the cross-sectional structure of the metasurface 1B of the present modification is similar to the cross-sectional structure of the metasurface 1A of the above embodiment (see FIG. 3). As in the above embodiment, the metal film 5 is disposed in each of the M pixels 20 and is located in each pixel 20 in the present modification. The metal films 5 in adjacent pixels 20 are separated from each other. The planar shape of the metal film 5 is substantially the same as the planar shape of the pixel 20, and in one example, the planar shape of the metal film 5 is square.

Figure 25:
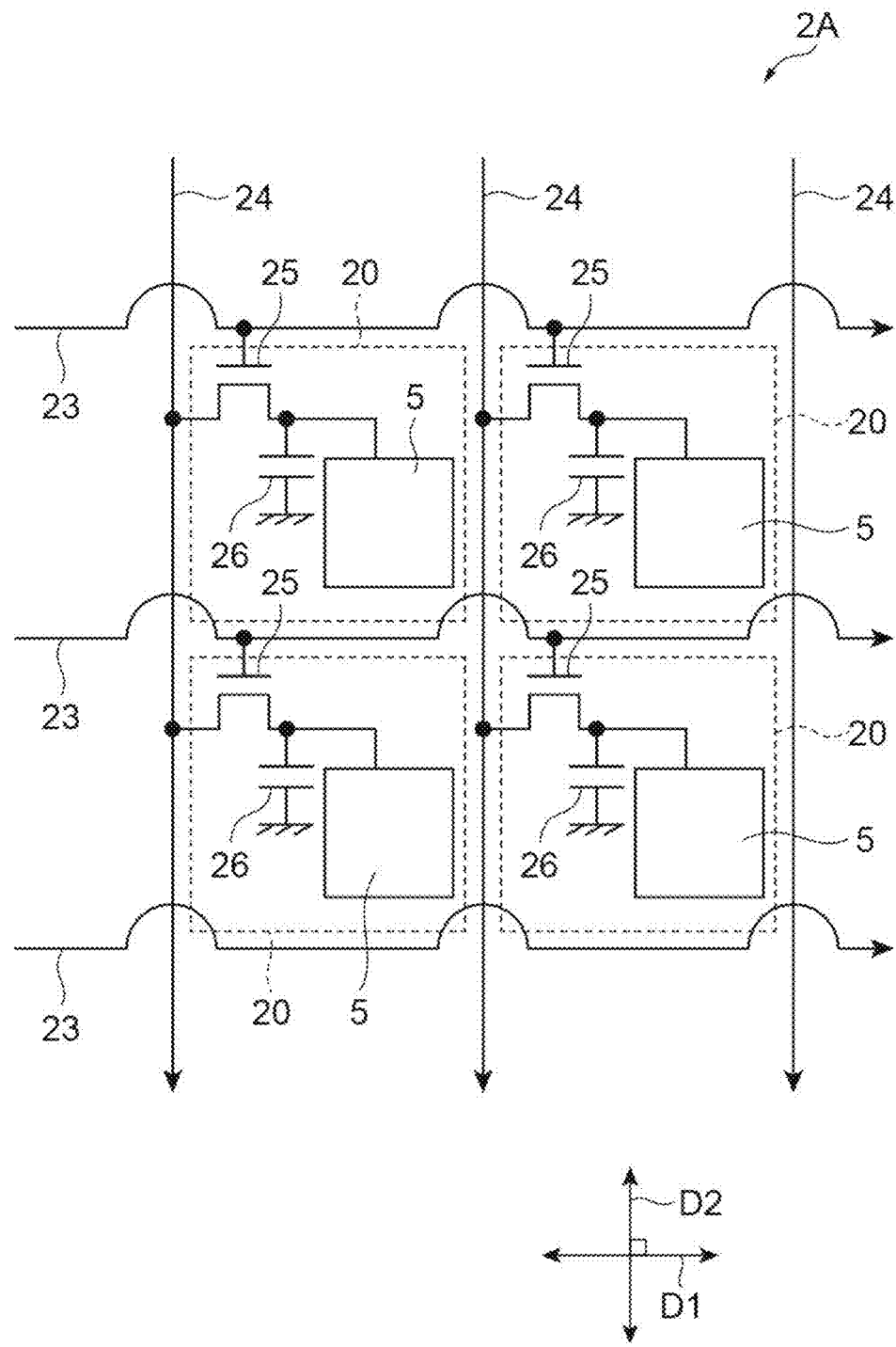
FIG. 25 is a diagram illustrating a configuration of a drive circuit 2A.

FIG. 25 is a diagram illustrating a configuration of a drive circuit 2A. The metasurface 1B includes a drive circuit 2A instead of the drive circuit 2 of the above embodiment. The drive circuit 2A of the present modification includes $M_1$ gate drive lines 23 and $M_2$ voltage supply lines 24. The $M_1$ gate drive lines 23 each extend along the row direction (that is, the direction D1) and are arranged along the column direction (that is, the direction D2). The $M_2$ voltage supply lines 24 each extend along the column direction (that is, the direction D2) and are arranged along the row direction (that is, the direction D1). The gate drive line 23 on the $m_1$-th row (where $m_1=1, 2, \ldots, M_1$) is electrically connected to a control terminal (gate) of the transistor 25 provided for each of the pixels 20 located on the $m_1$-th row. The voltage supply line 24 on the $m_2$-th column (where $m_2=1, 2, \ldots, M_2$) is electrically connected to one of current terminals (for example, a source) of the transistor 25 provided in each of the pixels 20 located on the $m_2$-th column. Another one of the current terminals (for example, a drain) of the transistor 25 is electrically connected to the metal film 5 of the pixel 20 via wiring in the pixel 20.

The drive circuit 2A further includes a plurality of capacitors 26 disposed in each of the pixels 20. The capacitor 26, which is an example of a voltage holding unit in the present modification, holds a voltage applied to the metal film 5 in the pixel 20 for each individual metal film 5. The specific configuration of the capacitor 26 is as described in the above embodiment.

As in the present modification, the M pixels may be arrayed two-dimensionally. In this case, the effects similar to those of the above embodiment can still be provided.

Second Embodiment

Figure 26:
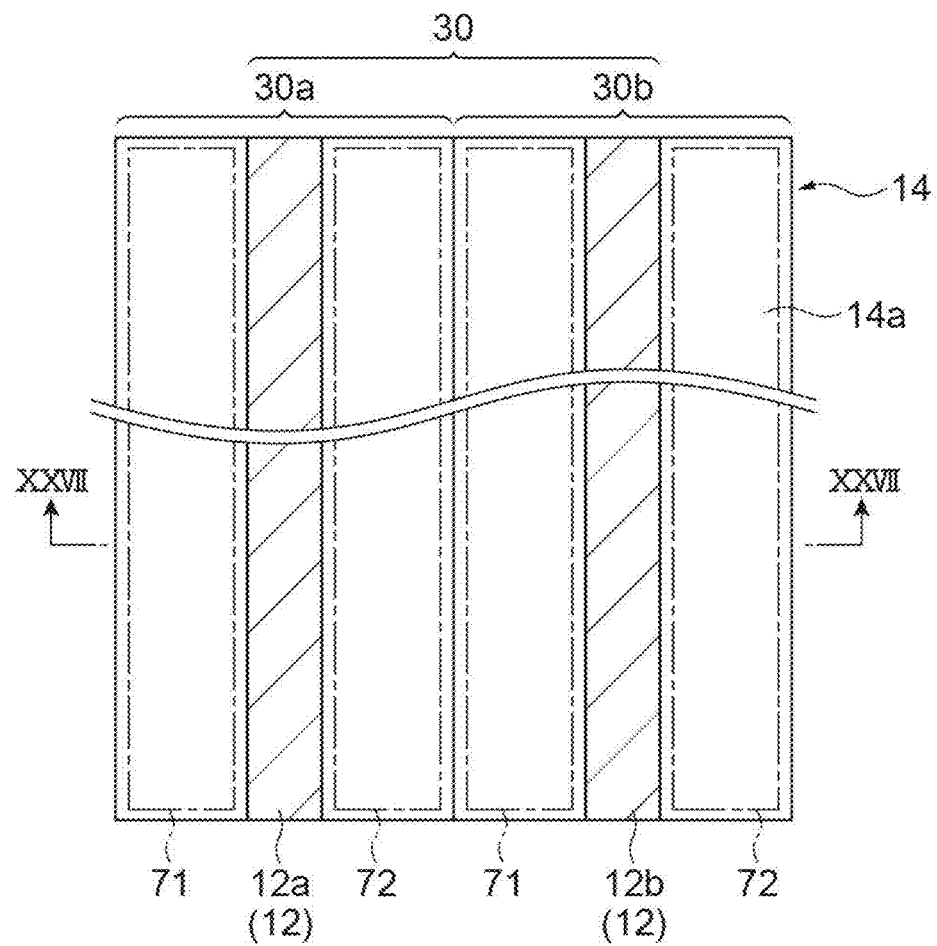
FIG. 26 is an enlarged plan view showing one pixel 30 included in a variable-phase device according to a second embodiment of the present invention.
Figure 26:
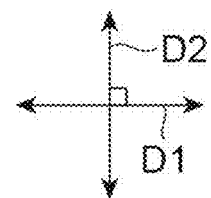
Figure 27:
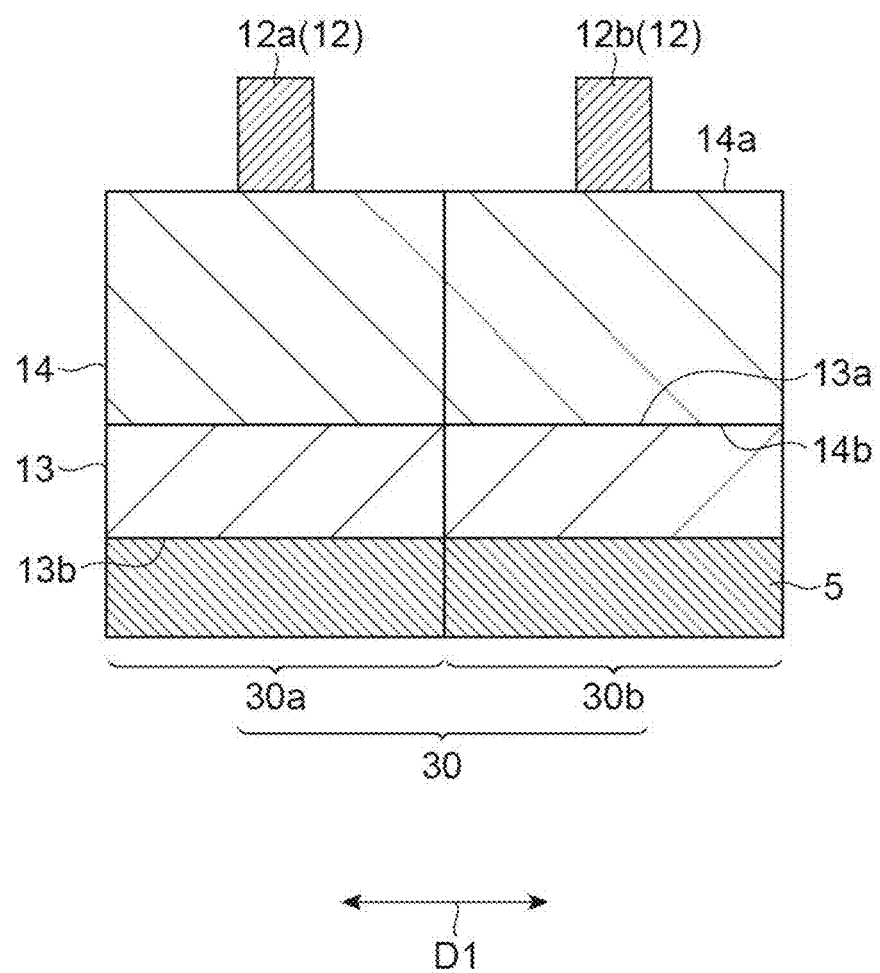
FIG. 27 is a cross-sectional view taken along line XXVII-XXVII shown in FIG. 26.

FIG. 26 is an enlarged plan view showing one pixel 30 included in a variable-phase device according to a second embodiment of the present invention. FIG. 27 is a cross-sectional view taken along line XXVII-XXVII shown in FIG. 26. The variable-phase device of the present embodiment has a configuration in which M pixels 30 are arranged one-dimensionally as shown in FIG. 1 or two-dimensionally as shown in FIG. 23. The array pitch of the M pixels 30 is less than the wavelength of incident light and is constant along the array direction of the M pixels 30.

Each pixel 30 includes N sub-pixels 30a, 30b (where N is an integer of 2 or more; the figure shows the case of N=2). Each of the sub-pixels 30a, 30b has a structure for changing the phase of incident light. The sub-pixels 30a, 30b are arranged in a line along the array direction of the pixels 30 (the direction D1 in the present embodiment). The widths of the sub-pixels 30a, 30b defined along the array direction are equal to each other. In a case where N is 3 or more, the array pitch of the sub-pixels (the distance between centers of adjacent sub-pixels along the direction D1) is constant along the array direction of the N sub-pixels.

A major difference between the first embodiment and the second embodiment is that, in the second embodiment, a substrate 13 and a refractive index modulation layer 14 are disposed instead of the stacked structure 7 and that a Si film 12 is disposed instead of the metal film 11. Except for such difference, the structure of the second embodiment is the same as the structure of the first embodiment. The variable-phase device of the second embodiment has a so-called high contrast gratings (HCG) structure and modulates the phase of the light L to be modulated for each pixel 30 by changing the refractive index of the refractive index modulation layer 14.

The substrate 13 includes, for example, GaAs or Si, and has a flat main surface 13a and a rear surface 13b. The thickness of the substrate 13 falls within the range of, for example, 100 to 2,000 µm. The refractive index modulation layer 14 is an inorganic dielectric layer disposed on the main surface 13a of the substrate 13. The refractive index modulation layer 14 is comprised of a material whose refractive index changes in accordance with the magnitude of the electric field, such as KTN (an oxide crystal including K, Nb, and Ta), LN (an oxide crystal including Nb, Li, and $O_2$), or an electro-optic polymer, and has a thickness falling within the range of, for example, 50 nm to 1,000 µm.

The Si film 12 is disposed on one surface 14a side of the refractive index modulation layer 14 (the side opposite to the substrate 13). In one example, the Si film 12 is disposed on the surface 14a of the refractive index modulation layer 14 to be in contact with the surface 14a. The Si film 12 has conductivity and functions as one of a pair of electrodes for applying an electric field to the refractive index modulation layer 14. The film thickness of the Si film 12 falls within the range of, for example, 100 to 1,000 nm, and is 850 nm in one example. The Si film 12 includes a partial film 12a disposed on the refractive index modulation layer 14 of the sub-pixel 30a and a partial film 12b disposed on the refractive index modulation layer 14 of the sub-pixel 30b. As illustrated in FIG. 26, the partial films 12a and 12b are arranged along the direction D1 and separated from each other. The center positions of the partial films 12a and 12b as located along the direction D1 coincide with the center positions of the sub-pixels 30a and 30b also located along the direction D1. The widths Wa and Wb of the partial films 12a and 12b defined along the direction D1 are set to be smaller than the widths of the sub-pixels 30a and 30b also defined along the direction D1, and are set to be sufficiently smaller than the wavelength of the t light L to be modulated. The widths Wa and Wb are equal to each other. The widths Wa and Wb of the partial films 12a and 12b fall within the range of, for example, 100 to 360 nm, and is 240 nm in one example. The distance between centers of the partial films 12a and 12b (that is, the array pitch of the sub-pixels 30a and 30b) falls within the range of, for example, 100 to 2,000 nm, and is 400 nm in one example.

The metal film 5 is disposed on the other surface 14b side of the refractive index modulation layer 14. In the present embodiment, the metal film 5 is disposed on the rear surface 13b of the substrate 13 to be in contact with the rear surface 13b. The metal film 5 reflects the light L to be modulated that is inputted to the refractive index modulation layer 14 toward the surface 14a. Note that the specific configuration of the metal film 5 is similar to the configuration of the above embodiment.

The variable-phase device of the present embodiment further includes a drive circuit (not illustrated). The drive circuit controls voltages applied between the partial films 12a, 12b of the Si film 12 and the metal film 5 individually for each of the partial films 12a and 12b. The configuration of the drive circuit is similar to the configuration illustrated in FIG. 4 or FIG. 25. Note that, however, the transistor 25 is disposed in each of the sub-pixels 30a and 30b, and the current terminals of these transistors 25 are electrically connected to the partial films 12a and 12b, respectively.

When a voltage is applied between the partial film 12a (or 12b) and the metal film 5, the refractive index of the refractive index modulation layer 14 changes in accordance with the magnitude of the electric field generated by the voltage. Accordingly, the optical distance from the surface 14a of the refractive index modulation layer 14 (light incident plane) to the surface of the metal film 5 (light reflecting surface) varies, and thus the phase of a partial light beam (outgoing light) outputted from the surface 14a after reflected by the metal film 5 is dependent on the magnitude of the voltage. Since the voltages applied between the partial films 12a and 12b of the Si film 12 and the metal film 5 are individually controlled for each of the partial films 12a and 12b, the phase of the light to be modulated is modulated for each of the sub-pixels 30a and 30b. In other words, as in the above-described embodiment, the configuration of the present embodiment makes it possible to independently control phases for each of the sub-pixels 30a and 30b.

Third Embodiment

Figure 28:
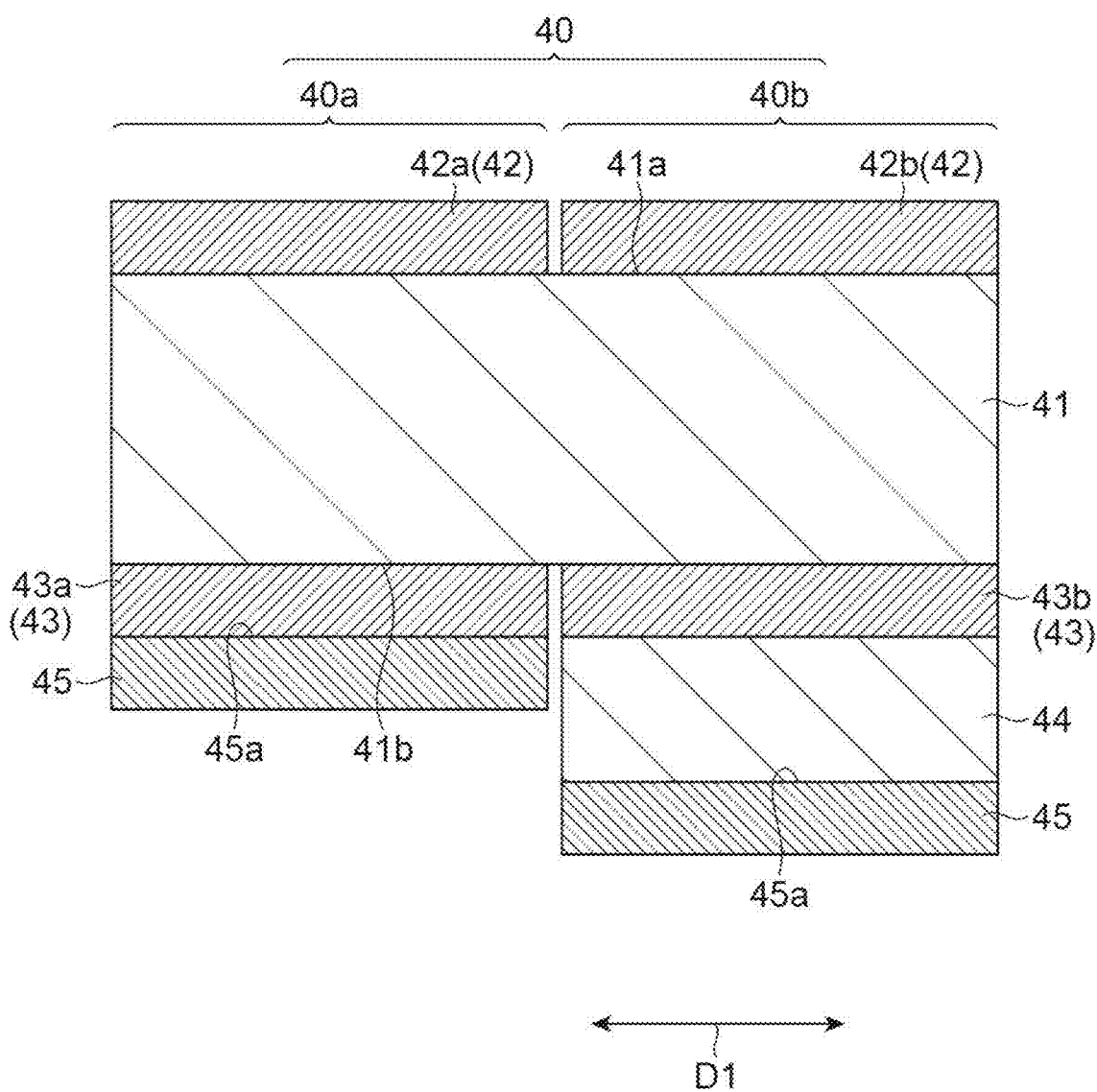
FIG. 28 is a diagram illustrating a cross-sectional structure of one pixel 40 included in a variable-phase device according to a third embodiment of the present invention.

FIG. 28 is a diagram illustrating a cross-sectional structure of one pixel 40 included in a variable-phase device according to a third embodiment of the present invention. The variable-phase device of the present embodiment has a configuration in which M pixels 40 are arranged one-dimensionally as shown in FIG. 1 or two-dimensionally as shown in FIG. 23. The array pitch of the M pixels 40 is less than the wavelength of incident light and is constant along the array direction of the M pixels 40.

Each pixel 40 includes N sub-pixels 40a, 40b (where N is an integer of 2 or more; the figure shows the case of N=2). Each of the sub-pixels 40a, 40b has a structure for changing the phase of incident light. The sub-pixels 40a, 40b are arranged in a line along the array direction of the pixels 40 (the direction D1 in the present embodiment). The widths of the sub-pixels 40a, 40b defined along the array direction are equal to each other. In a case where N is 3 or more, the array pitch of the sub-pixels (the distance between centers of adjacent sub-pixels along the direction D1) is constant along the array direction of the N sub-pixels.

The structure of the variable-phase device is similar to the structure of the variable-phase device of the above-described first embodiment except that the variable-phase device includes an electro-optic crystal layer 41 instead of the stacked structure 7 of the above-described first embodiment. The electro-optic crystal layer 41 mainly includes a material having an electro-optic effect (the Pockels effect or the Kerr effect) (for example, KTN (an oxide crystal including K, Nb, and Ta), LN (an oxide crystal including Nb, Li, and $O_2$), or the like), and has a flat main surface 41a and a rear surface 41b. The thickness of the electro-optic crystal layer 41 falls within the range of, for example, 10 to 1,000 nm. The variable-phase device further includes a transparent electrode film 42 (a first transparent electrode film) disposed on the main surface 41a side of the electro-optic crystal layer 41 and a transparent electrode film 43 (a second transparent electrode film) disposed on the rear surface 41b side. The transparent electrode film 42 is disposed over the main surface 41a and, in one example, is in contact with the main surface 41a. The transparent electrode film 43 is disposed over the rear surface 41b and, in one example, is in contact with the rear surface 41b. The transparent electrode films 42 and 43 have conductivity and mainly include a material that transmits the light to be modulated (for example, ITO, AZO, GZO, and the like). The thickness of the transparent electrode films 42 and 43 falls within the range of, for example, 10 to 1,000 nm.

The transparent electrode film 42 functions as one of a pair of electrodes for applying an electric field to the electro-optic crystal layer 41. The transparent electrode film 42 includes a partial film 42a disposed on the electro-optic crystal layer 41 of the sub-pixel 40a and a partial film 42b disposed on the electro-optic crystal layer 41 of the sub-pixel 40b. The partial films 42a and 42b are arranged along the direction D1 and separated from each other. The transparent electrode film 43 functions as the other one of a pair of electrodes for applying an electric field to the electro-optic crystal layer 41. The transparent electrode film 43 includes a partial film 43a disposed on the electro-optic crystal layer 41 of the sub-pixel 40a and a partial film 43b disposed on the electro-optic crystal layer 41 of the sub-pixel 40b. The partial films 43a and 43b are arranged along the direction D1 and separated from each other.

The variable-phase device further includes a light reflecting film 45 having a light reflecting surface 45a. The light reflecting film 45 is provided in each of the sub-pixels 40a and 40b, and the light reflecting surface 45a is opposed to the rear surface 41b of the electro-optic crystal layer 41. The light reflecting surface 45a reflects the light to be modulated that is inputted to the electro-optic crystal layer 41 toward the main surface 41a. The light reflecting film 45 is, for example, a metal film formed on the transparent electrode film 43, and includes a metal such as Au or Al. The thickness of the light reflecting film 45 falls within the range of, for example, 30 to 100 nm. Note that the transparent electrode film 43 is disposed between the light reflecting surface 45a and the electro-optic crystal layer 41.

In the present embodiment, the sub-pixels 40a and 40b are different from each other in optical distance between the transparent electrode film 43 and the light reflecting surface 45a. Specifically, while the sub-pixel 40b includes a light-transmissive layer 44 disposed between the partial film 43b of the transparent electrode film 43 and the light reflecting surface 45a, the sub-pixel 40a does not include the light-transmissive layer 44 between the partial film 43a of the transparent electrode film 43 and the light reflecting surface 45a. The light-transmissive layer 44 includes, for example, $SiO_2$, $Si_3N_4$, air, or a semiconductor substrate (for example, GaAs or Si).

The variable-phase device of the present embodiment further includes a drive circuit (not illustrated). The drive circuit individually controls voltages applied between the partial films 42a and 42b of the transparent electrode film 42 and the partial films 43a and 43b of the transparent electrode film 43 for each partial film. The configuration of the drive circuit is similar to the configuration illustrated in FIG. 4 or FIG. 25. Note that, however, the transistor 25 is disposed in each of the sub-pixels 40a and 40b, and the current terminals of these transistors 25 are electrically connected to the partial films 42a and 42b or the partial films 43a and 43b, respectively.

When a voltage is applied between the partial film 42a and the partial film 43a, the refractive index of the electro-optic crystal layer 41 in the sub-pixel 40a changes in accordance with the magnitude of the electric field generated by the voltage. Accordingly, the optical distance from the main surface 41a of the electro-optic crystal layer 41 (light incident plane) to the rear surface 41b varies, and thus the phase of a partial light beam (outgoing light) outputted from the main surface 41a after reflected by the light reflecting surface 45a is dependent on the magnitude of the voltage. The same applies to the sub-pixel 40b. In addition, since the voltages applied between the transparent electrode film 42 and the transparent electrode film 43 are individually controlled for each of the partial films, the phase of the light to be modulated is modulated for each of the sub-pixels 40a and 40b. In other words, as in the above-described embodiment, the configuration of the present embodiment makes it possible to independently control phases for each of the sub-pixels 40a and 40b.

In addition, In the present embodiment, the sub-pixels 40a and 40b are different from each other in optical distance between the transparent electrode film 43 and the light reflecting surface 45a depending on whether the light-transmissive layer 44 is present. As a result, the initial phase of the outgoing light can be made different between the sub-pixels 40a and 40b, and therefore the range of variable phases in each pixel 40 can be expanded. Such effects can also be provided in a case where the number N of sub-pixels is three or more. In particular, If the initial phases of N sub-pixels are shifted from each other by $2\pi/N$ (rad), it is made possible to achieve a significant phase change in each pixel 40 while maximizing the initial phase difference between sub-pixels and reducing the range of phase variation in each sub-pixel.

Note that, in the present embodiment, in each pixel 40, the voltage between the partial film 42a and the partial film 43a of the sub-pixel 40a and the voltage between the partial film 42b and the partial film 43b of the sub-pixel 40b are controlled independently of (separately from) each other. However, in a case where the optical distance between the transparent electrode film 43 and the light reflecting surface 45a is different between the sub-pixels 40a and 40b, these voltages may be collectively controlled (to the same voltage).

SPECIFIC EXAMPLES

Figure 29:
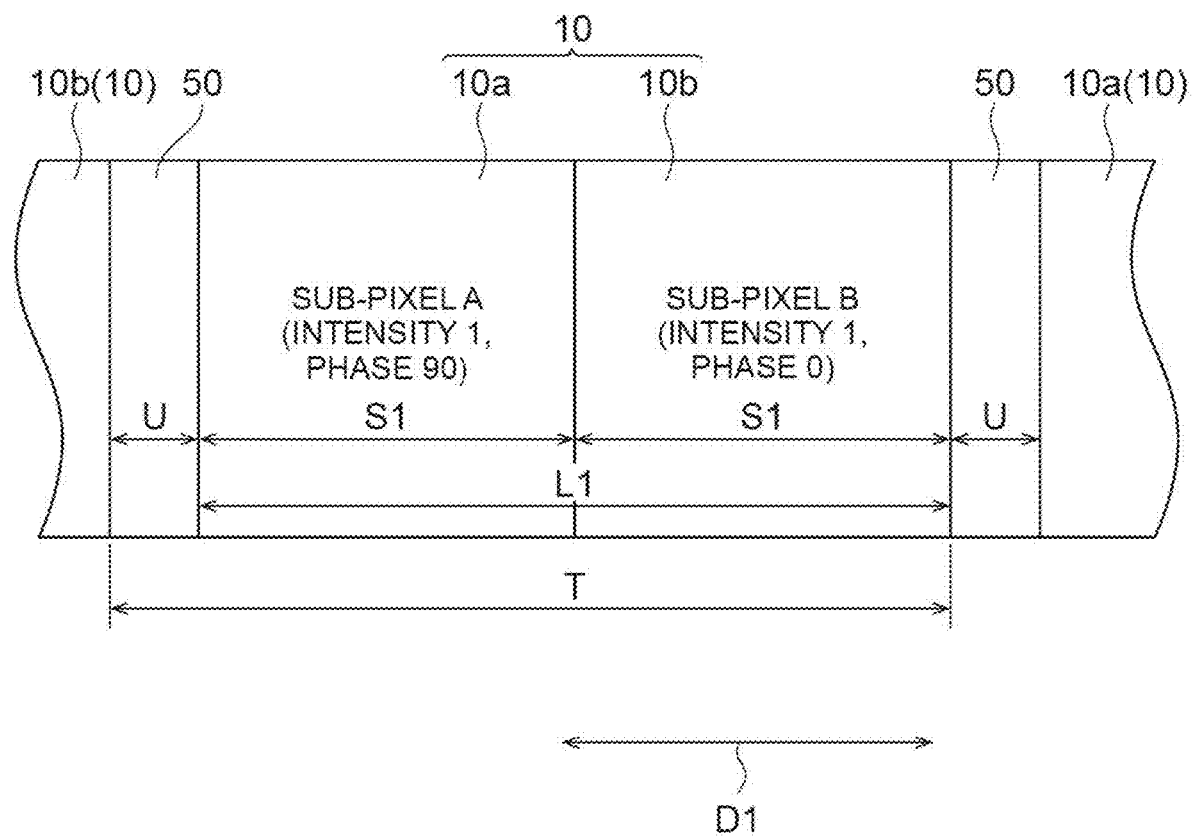
FIG. 29 is a schematic diagram showing an enlarged view of one pixel 10 among a plurality of pixels 10 arranged along a direction D1.

Now, the following discusses a model in which pixels are separated from each other by providing a gap therebetween for the purpose of reducing interface between adjacent pixels. FIG. 29 is a schematic diagram showing an enlarged view of one pixel 10 among a plurality of pixels 10 arranged along the direction D1. The pixel 10 includes two sub-pixels 10a and 10b arranged along the direction D1. In addition, a gap 50 is provided between the pixel 10 and the pixel 10 adjacent to each other. The gap 50 does not function as a pixel.

Figure 30:
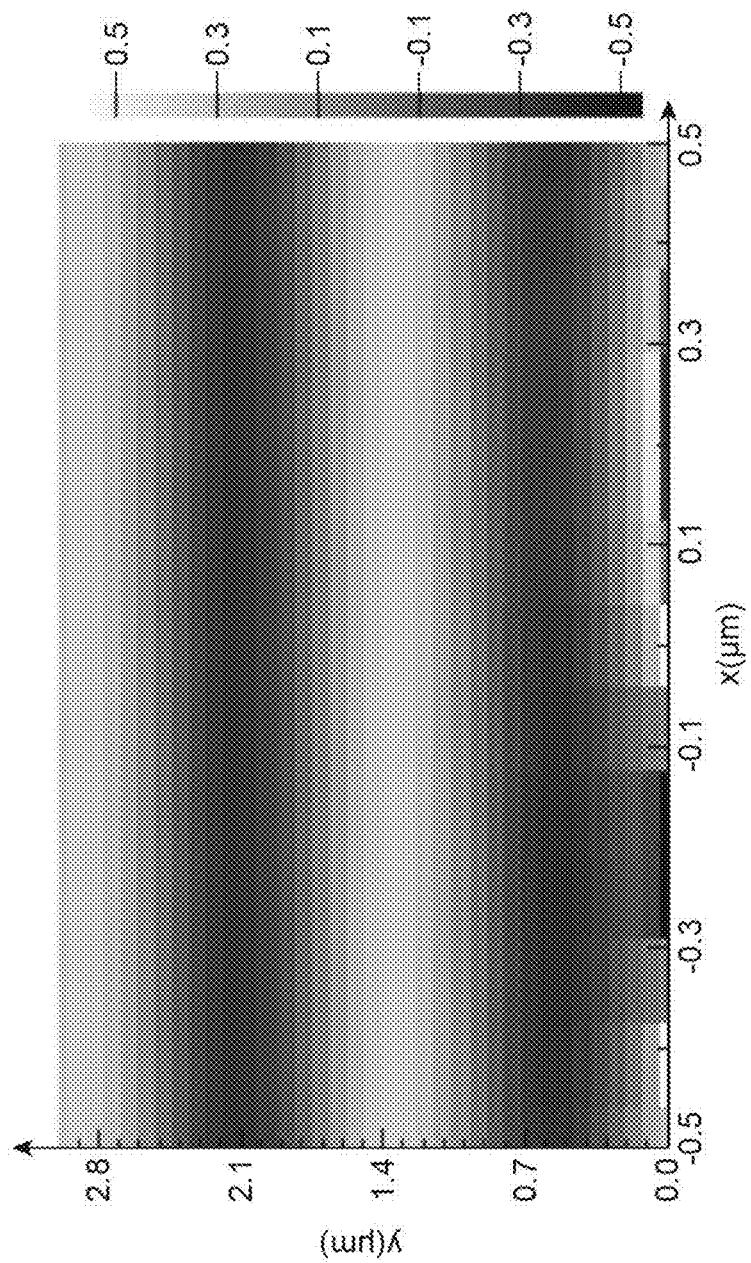
FIG. 30 is a graph obtained by simulating a state in which two partial light beams outputted from the sub-pixels 10a and 10b are combined, in a case where the pitch T is 1,000 nm.

First, the following discusses a model in which the wavelength of incident light is 1,550 nm and the pitch T is 1,000 nm. In a case where the width U of the gap 50 defined along the direction D1 is 200 nm, the width L1 of the pixel 10 is 800 nm, and the width Si of each of the sub-pixels 10a and 10b is 400 nm. It is assumed that the intensity ratio between the sub-pixel 10a and the sub-pixel 10b is 1:1 and the phases of the sub-pixels 10a and 10b are $\pi/2$ (rad) and 0 (rad), respectively, in the metasurface. When light having a Gaussian-function light intensity distribution (light source size: 200 nm) is incident, two partial light beams emitted from the sub-pixels 10a and 10b are combined with each other as shown in FIG. 30. Note that, as with FIG. 11, FIG. 30 is a graph obtained by simulating a state in which two partial light beams outputted from the sub-pixels 10a and 10b are combined. As seen above, as long as the pitch T is less than the wavelength of incident light, partial light beams outputted from the sub-pixels 10a and 10b can be suitably combined even if the gap 50 is provided between the pixels 10.

Figure 31:
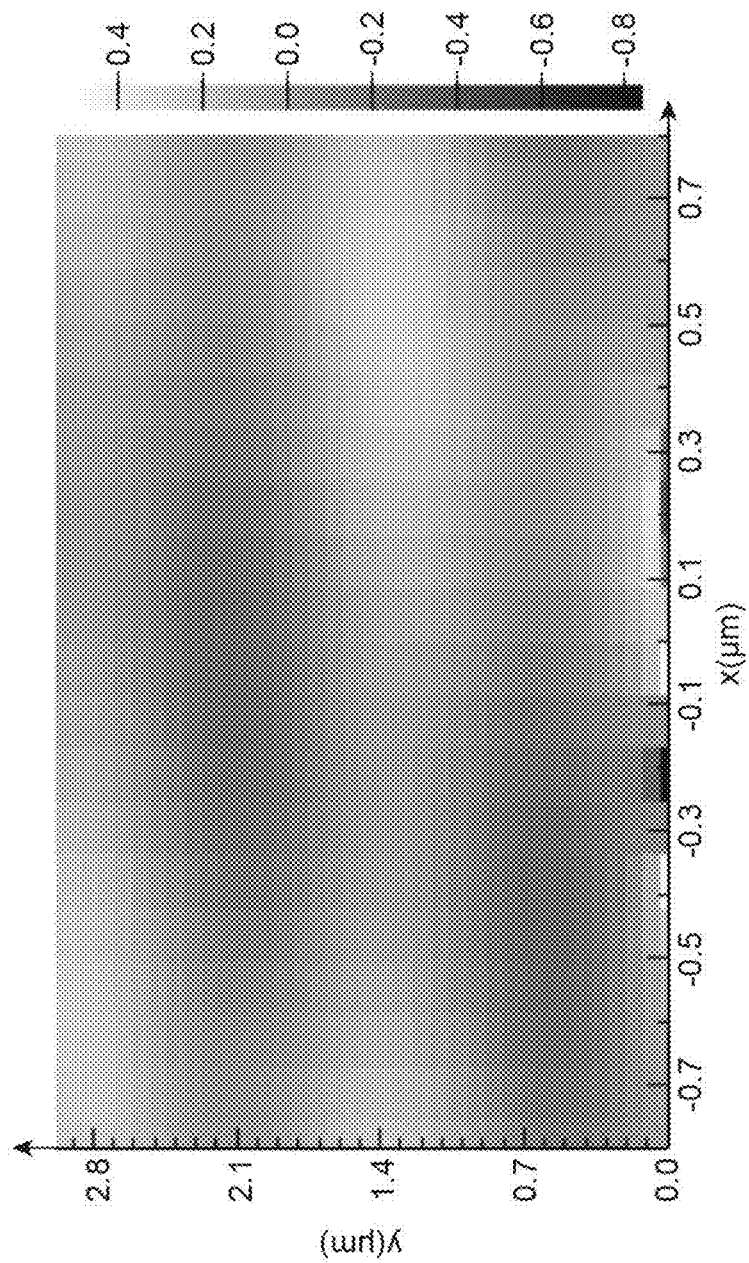
FIG. 31 is a graph obtained by simulating a state in which two partial light beams outputted from the sub-pixels 10a and 10b are combined, in a case where the pitch T is 1,600 nm.

Next, the following discusses a model in which the wavelength of incident light is 1,550 nm and the pitch T is 1,600 nm. It is assumed that the width L1 of the pixel 10 and the width Si of the sub-pixels 10a and 10b are the same as in the above example, except that the width U of the gap 50 is changed to 800 nm. It is assumed that the intensity ratio between the sub-pixel 10a and the sub-pixel 10b is 1:1 and the phases of the sub-pixels 10a and 10b are $\pi/2$ (rad) and 0 (rad), respectively, in the metasurface. When light having a Gaussian-function light intensity distribution (light source size: 200 nm) is incident, two partial light beams outputted from the sub-pixels 10a and 10b are not combined with each other and the wavefront collapses as shown in FIG. 31. As seen above, in spite of the fact that the width L1 of the pixel 10 is less than the wavelength of incident light, when the pitch T is greater than the wavelength of incident light, partial light beams outputted from the sub-pixels 10a and 10b are not combined, only to cause interference.

Figure 32:
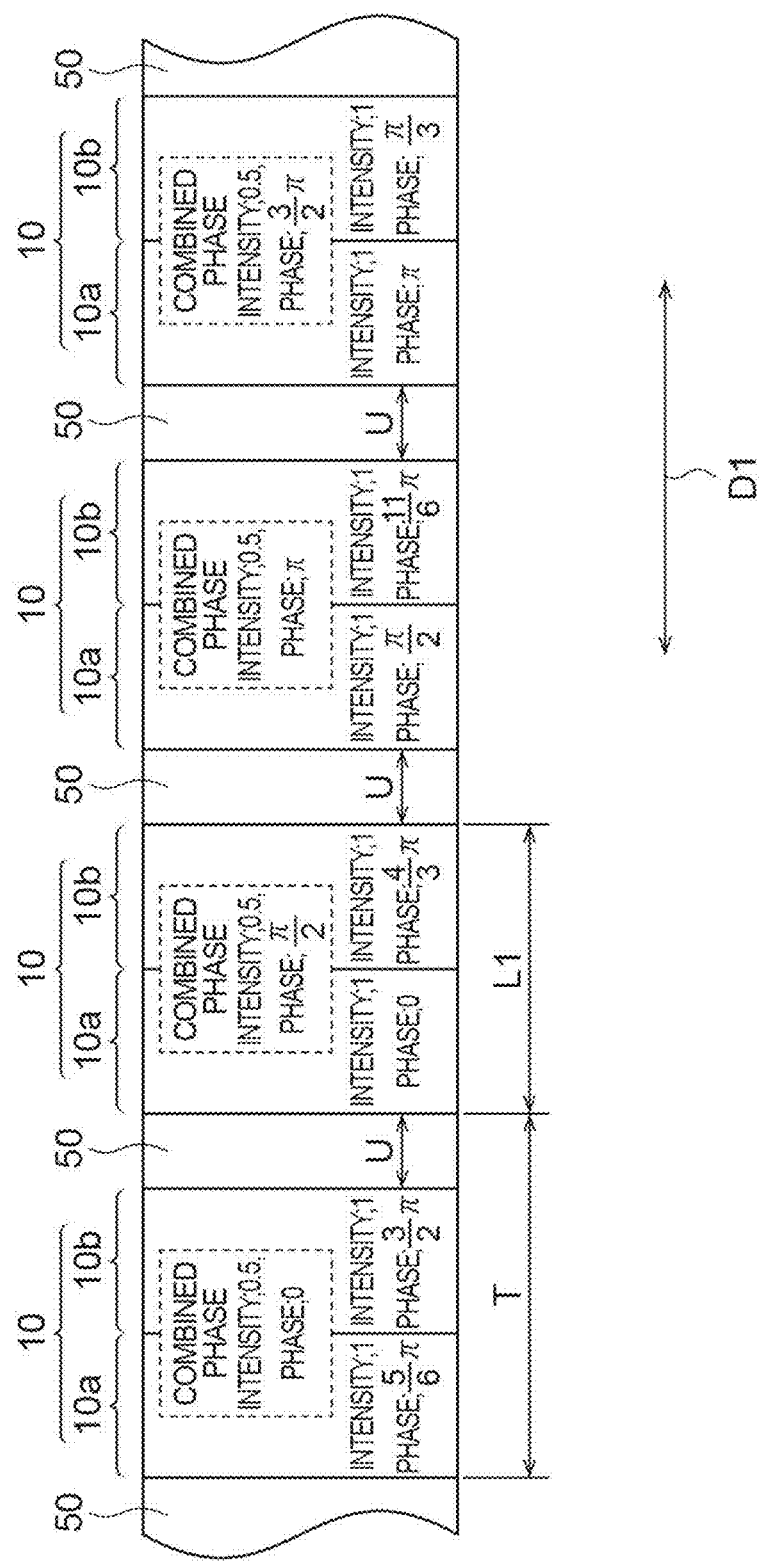
FIG. 32 is a diagram schematically illustrating four pixels 10 arranged along the direction D1.

The present inventors have further studied a suitable size of the gap 50. FIG. 32 is a diagram schematically illustrating four pixels 10 arranged along the direction D1. Each of the pixels 10 includes two sub-pixels 10a and 10b. While the width L1 of the pixel 10 is set to 800 nm (fixed), the width U of the gap 50 is set to four different values: 0 nm, 100 nm, 200 nm, and 300 nm. It is assumed that the intensity ratio between the sub-pixel 10a and the sub-pixel 10b is 1:1 in every pixel 10. It is further assumed that the combined phase of each pixel 10 is 0 (rad), $\pi/2$ (rad), $\pi$ (rad), and $3\pi/2$ (rad) from left to right. Specifically, it is assumed that the phases of the sub-pixels 10a and 10b of the leftmost pixel 10 are $5\pi/6$ (rad) and $3\pi/2$ (rad), respectively, the phases of the sub-pixels 10a and 10b of the second pixel 10 from left are 0 (rad) and $4\pi/3$ (rad), respectively, the phases of the sub-pixels 10a and 10b of the third pixel 10 from left are $\pi/2$ (rad) and $11\pi/6$ (rad), respectively, and the phases of the sub-pixels 10a and 10b of the rightmost pixel 10 are $\pi$ (rad) and $7\pi/3$ (rad), respectively.

Figure 33:
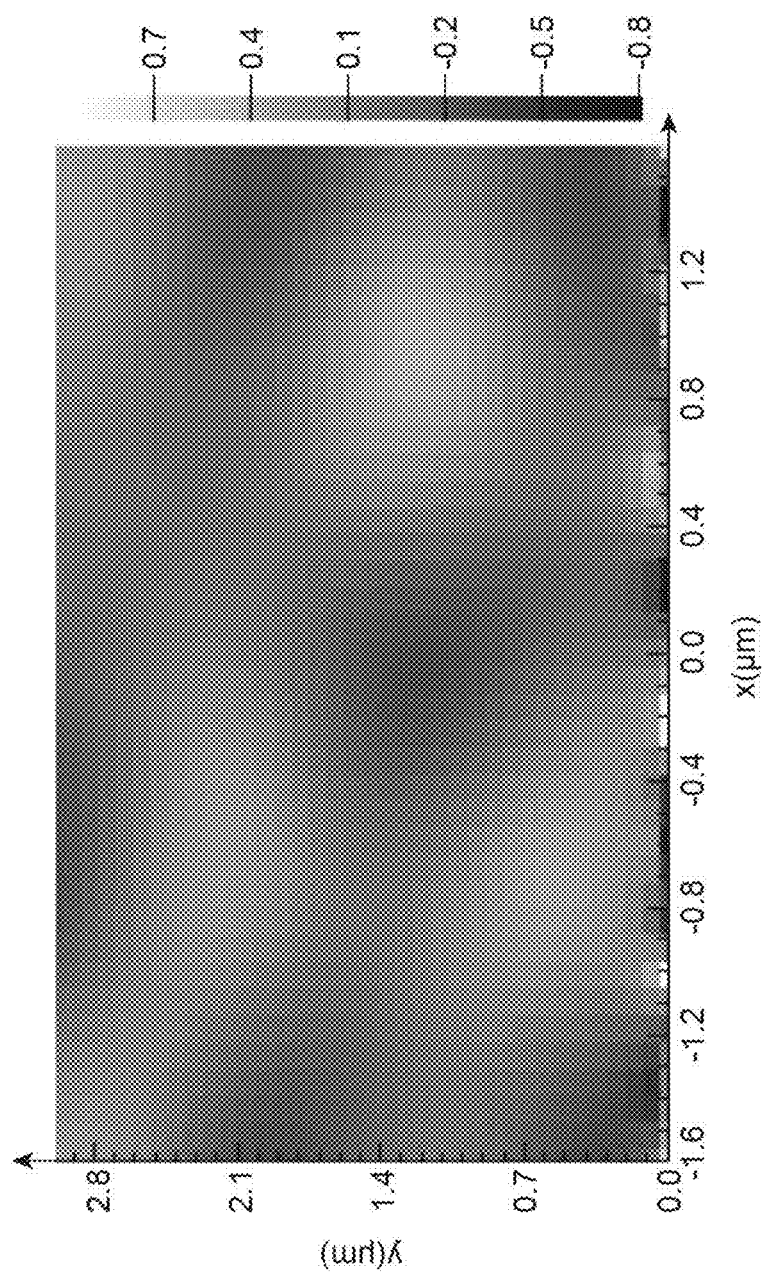
FIG. 33 is a graph obtained by simulating a state in which light is outputted from four pixels 10, in a case where the width U of a gap 50 is 0 nm.
Figure 34:
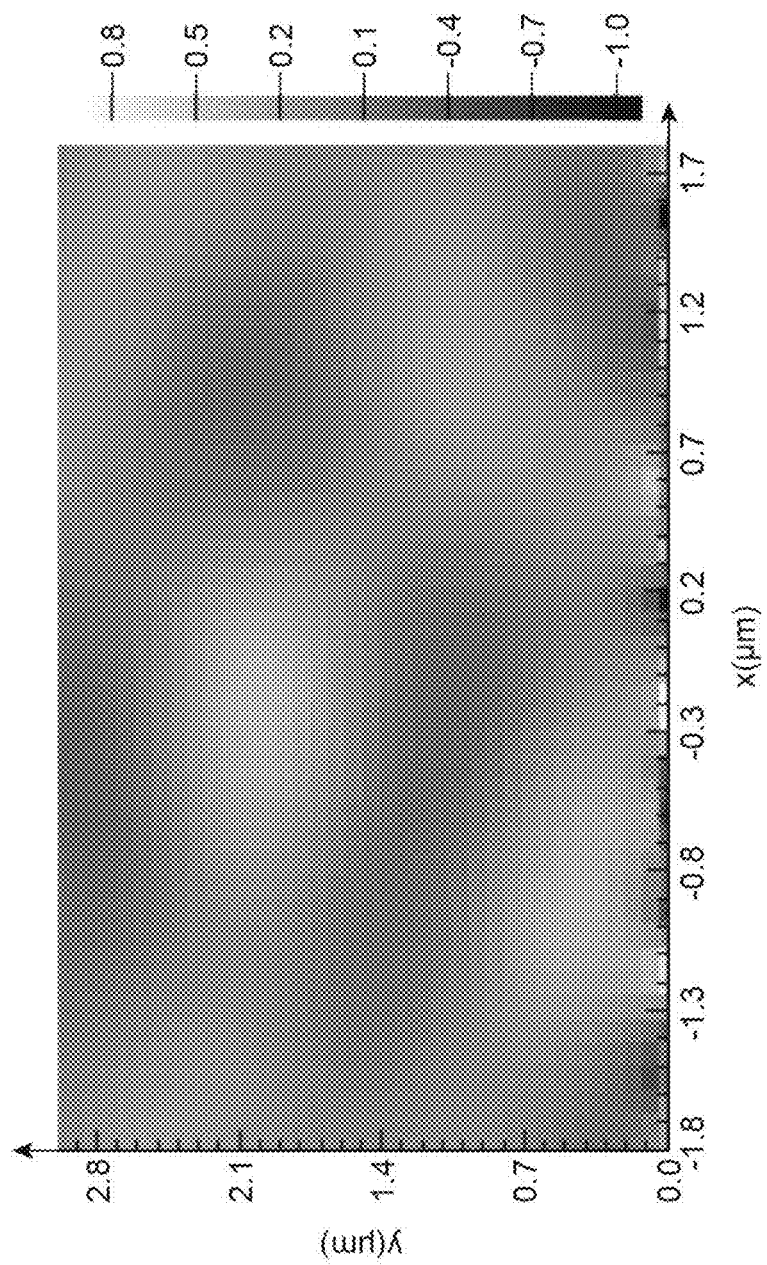
FIG. 34 is a graph obtained by simulating a state in which light is outputted from four pixels 10, in a case where the width U of the gap 50 is 100 nm.
Figure 35:
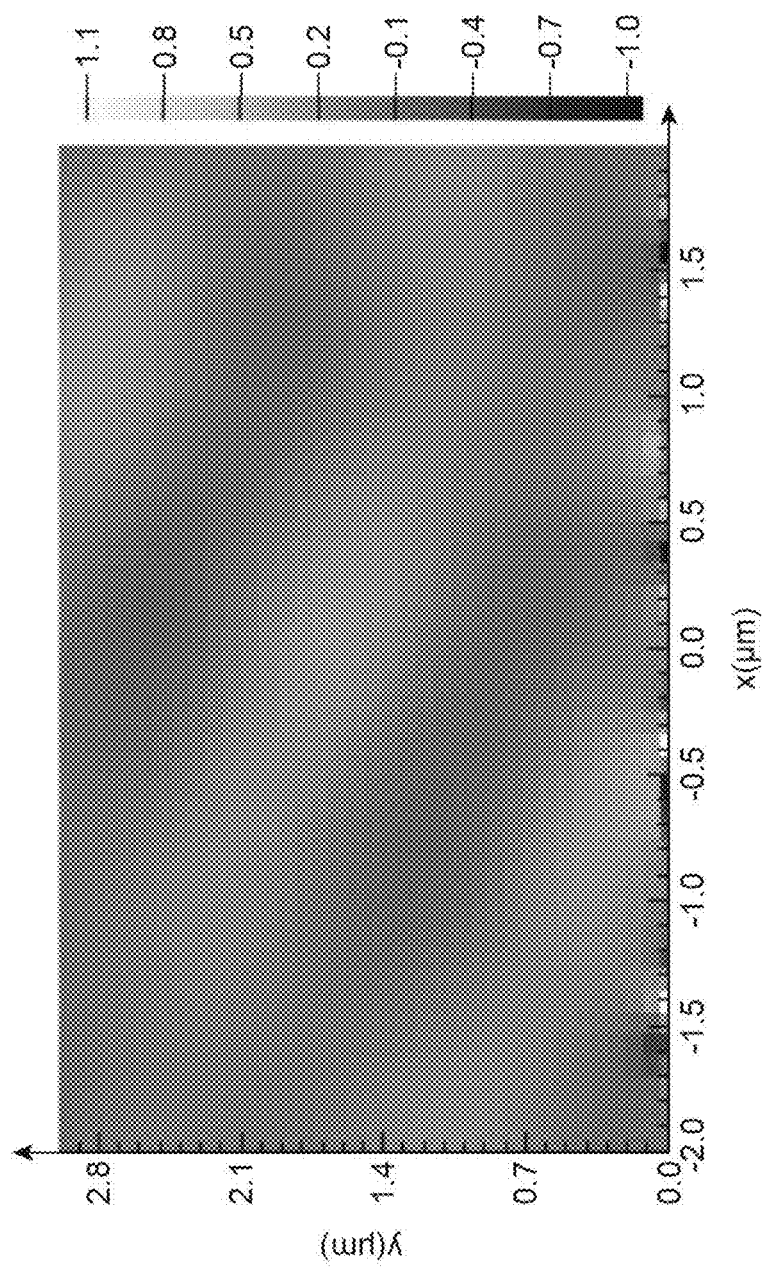
FIG. 35 is a graph obtained by simulating a state in which light is outputted from four pixels 10, in a case where the width U of the gap 50 is 200 nm.
Figure 36:
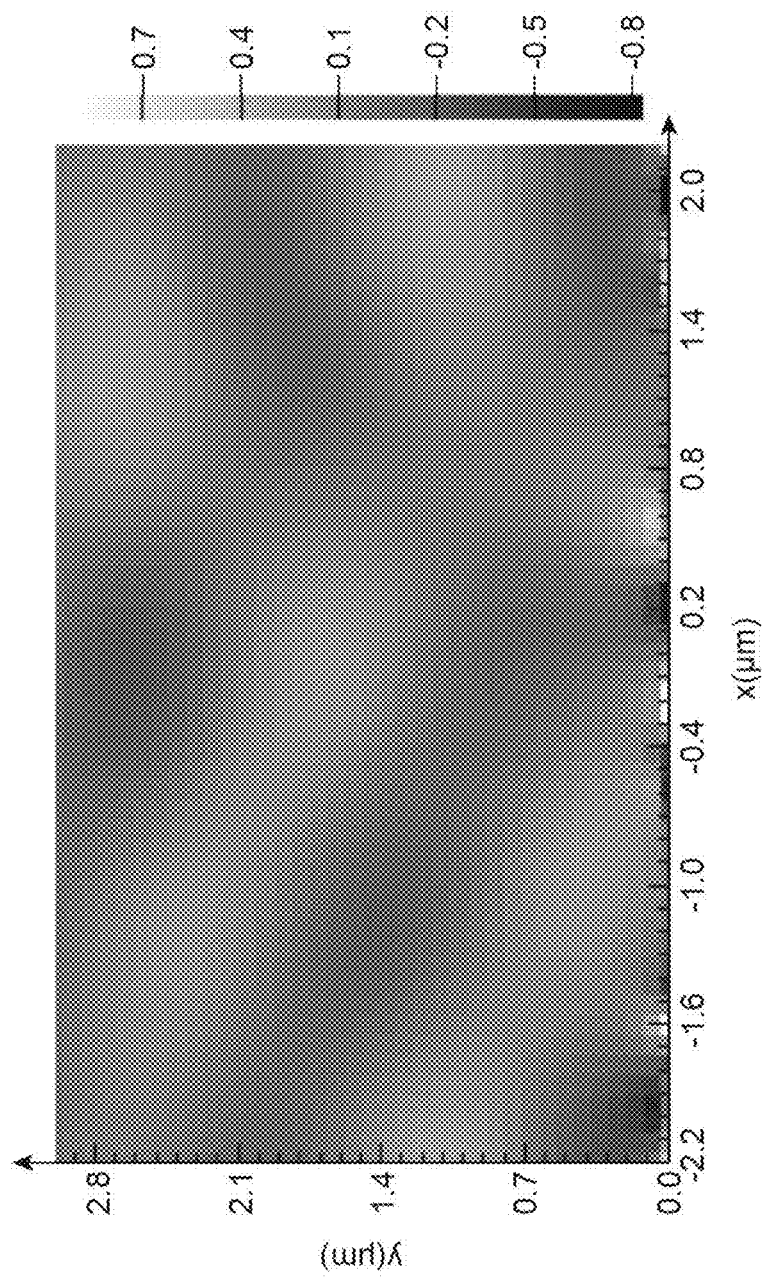
FIG. 36 is a graph obtained by simulating a state in which light is outputted from four pixels 10, in a case where the width U of the gap 50 is 300 nm.

FIGS. 33 to 36 are graphs obtained by simulating a state in which light is outputted from the four pixels 10. FIG. 33 shows the case where the width U of the gap 50 is 0 nm, FIG. 34 shows the case where the width U is 100 nm, FIG. 35 shows the case where the width U is 200 nm, and FIG. 36 shows the case where the width U is 300 nm.

Representations of the vertical axis, the horizontal axis, and the like are similar to those in FIG. 11. The wavelength of incident light is 1,550 nm.

With reference to FIGS. 34 to 36 showing cases where the gap 50 is provided, interference (crosstalk) between pixels is recognized to be reduced as compared with FIG. 33 showing the case where the gap 50 is not provided. In particular, in the case where the width U of the gap 50 is 200 nm (that is, the ratio of the width U to the pitch T is 20%), interference (crosstalk) is remarkably reduced. Providing the gap 50 in this way can suppress interference between pixels to form a better wavefront. Note that, for example, the width U is preferably greater than 0% and equal to or less than 20% of the pitch T of the pixels.

The variable-phase device according to the present embodiment is not limited to the examples of the above-described embodiments but is indicated by the claims, and is intended to include every modification within the meaning and scope equivalent to the claims. For example, the above-described embodiments and modifications thereof may be combined in any way in accordance with a necessary purpose and effect. In the above embodiments and modifications thereof, descriptions have been given about a configuration in which the drive circuit is integrated with the stacked structure, the refractive index modulation layer, or the electro-optic crystal layer. However, in a configuration according to the present invention, the drive circuit may be separated from the stacked structure, the refractive index modulation layer, or the electro-optic crystal layer.

In addition, in the above embodiments and modifications thereof, descriptions have been given about examples in which the present invention is applied to a device that modulates phases of the inputted light to be modulated for each pixel. However, the present invention can also be applied to a device that emits light for each individual pixel. In other words, the variable-phase device may include M pixels that are arrayed one-dimensionally or two-dimensionally and emit light, the array pitch of the M pixels may be less than the emission wavelength and constant, and each of the M pixels may include N sub-pixels each having a structure in which the phase of outgoing light is variable. In this case, with respect to each of the M pixels, N partial light beams outputted from the N sub-pixels are also combined into light (a single light beam) having a single phase in the far field. Therefore, the effects similar to those of the above embodiments and modifications thereof can still be provided.

REFERENCE SIGNS LIST 1A, 1B . . . Metasurface; 1a . . . Main surface; 2, 2A . . . Drive circuit; 3 . . . Semiconductor layer (transparent conductive layer); 4 . . . Dielectric layer; 5 . . . Metal film; 7, 7A . . . Stacked structure; 7a . . . Main surface; 7b . . . Rear surface; 10, 10A . . . Pixel; 10a, 10b, 10c . . . Sub-pixel; 11 . . . Metal film; 11a to 11f . . . Partial film; 12 . . . Si film; 12a, 12b . . . Partial film; 13 . . . Substrate; 13a . . . Main surface; 13b . . . Rear surface; 14 . . . Refractive index modulation layer; 20 . . . Pixel; 20a, 20b, 20c . . . Sub-pixel; 21 . . . Semiconductor layer; 21a, 21b . . . Semiconductor region; 21c . . . Front surface; 23 . . . Gate drive line; 24 . . . Voltage supply line; 25 . . . Transistor; 25a . . . Gate electrode; 25b . . . Source electrode; 25c . . . Drain electrode; 25d . . . Wiring; 26 . . . Capacitor; 27, 28 . . . Insulating layer; 29 . . . Dielectric layer; 30, 40 . . . Pixel; 30a, 30b, 40a, 40b . . . Sub-pixel; 41 . . . Electro-optic crystal layer; 41a . . . Main surface; 41b . . . Rear surface; 42, 43 . . . Transparent electrode film; 42a, 42b, 43a, 43b . . . Partial film; 44 . . . Light-transmissive layer; 45 . . . Light reflecting film; 45a . . . Light reflecting surface; 50 . . . Gap; 71, 72 . . . Portion; D1, D2 . . . Direction; L . . . To-be-modulated light; Vd . . . Drive voltage; Vg . . . Gate voltage; and W1, W2 . . . Array pitch.

The invention claimed is:

1. A variable-phase device comprising:
M pixels (where M is an integer of 2 or more) arrayed one-dimensionally along a first direction on a reference plane or arrayed two-dimensionally along the first direction and a second direction intersecting with the first direction, each of the M pixels emitting light or modulating light, wherein an array pitch defined by a distance between centers of pixels being adjacent along at least the first direction out of the M pixels is less than a wavelength of incident light and constant along the first direction, each of the M pixels includes N sub-pixels (where N is an integer of 2 or more) each having a structure capable of changing a phase of the incident light, and in each of the M pixels, partial light beams outputted from the N sub-pixels are combined into light having a single phase in a far field, wherein in each of the M pixels, initial phases of the N sub-pixels are different from each other, and wherein the initial phases of the N sub-pixels are shifted from each other by $2\pi/N$ (rad).

2. The variable-phase device according to claim 1, further comprising:

a refractive index modulation layer having a first surface and a second surface, the first surface coinciding with the reference plane and the second surface opposed to the first surface, the refractive index modulation layer comprising a dielectric;

a Si film disposed on the first surface side of the refractive index modulation layer;

a metal film disposed on the second surface side of the refractive index modulation layer, the metal film reflecting the incident light taken into the refractive index modulation layer via the first surface toward the first surface; and a drive circuit configured to control a voltage applied between the Si film and the metal film, wherein the Si film includes a plurality of partial films disposed on each of the N sub-pixels and separated from each other, and the drive circuit individually controls a potential of each of the plurality of partial films in the Si film in order to modulate the phase of each of the N partial light beams outputted from the N sub-pixels.

3. The variable-phase device according to claim 1, further comprising:

an electro-optic crystal layer having a first surface and a second surface, the first surface coinciding with the reference plane, and the second surface being opposed to the first surface;

a first transparent electrode film disposed on the first surface side of the electro-optic crystal layer;

a light reflecting surface disposed on the second surface side of the electro-optic crystal layer, the light reflecting surface reflecting the incident light taken into the electro-optic crystal layer via the first surface toward the first surface;

a second transparent electrode film disposed between the light reflecting surface and the second surface of the electro-optic crystal layer; and a drive circuit configured to control a voltage applied between the first transparent electrode film and the second transparent electrode film, wherein at least one of the first transparent electrode film and the second transparent electrode film includes a plurality of partial films disposed on each of the N sub-pixels and separated from each other, and the drive circuit individually controls a potential of each of the plurality of partial films included in at least one of the first transparent electrode film and the second transparent electrode film in order to modulate the phase of each of the N partial light beams outputted from the N sub-pixels.

4. The variable-phase device according to claim 1, further comprising:

an electro-optic crystal layer having a first surface and a second surface, the first surface coinciding with the reference plane, and the second surface being opposed to the first surface;

a first transparent electrode film disposed on the first surface side of the electro-optic crystal layer;

a light reflecting surface disposed on the second surface side of the electro-optic crystal layer, the light reflecting surface reflecting the incident light taken into the electro-optic crystal layer via the first surface toward the first surface;

a second transparent electrode film disposed between the light reflecting surface and the second surface of the electro-optic crystal layer; and a drive circuit configured to control a voltage applied between the first transparent electrode film and the second transparent electrode film, wherein at least one of the first transparent electrode film and the second transparent electrode film includes a plurality of partial films disposed on each of the N sub-pixels and separated from each other, an optical distance between the second transparent electrode film and the light reflecting surface is different between or among the N sub-pixels so that initial phases of the N sub-pixels are different from each other, and the drive circuit individually or collectively controls potentials of the plurality of partial films included in at least one of the first transparent electrode film and the second transparent electrode film in order to modulate the phase of each of the N partial light beams outputted from the N sub-pixels.

5. The variable-phase device according to claim 4, wherein the initial phases of the N sub-pixels are shifted from each other by $2\pi/N$ (rad).

6. A variable-phase device comprising:

M pixels (where M is an integer of 2 or more) arrayed one-dimensionally along a first direction on a reference plane or arrayed two-dimensionally along the first direction and a second direction intersecting with the first direction, each of the M pixels emitting light or modulating light, wherein an array pitch defined by a distance between centers of pixels being adjacent along at least the first direction out of the M pixels is less than a wavelength of incident light and constant along the first direction, each of the M pixels includes N sub-pixels (where N is an integer of 2 or more) each having a structure capable of changing a phase of the incident light, and in each of the M pixels, partial light beams outputted from the N sub-pixels are combined into light having a single phase in a far field, wherein the variable-phase device further comprises:

a stacked structure including a transparent conductive layer and a dielectric layer and having a first surface and a second surface, the first surface coinciding with the reference plane and being a surface that the incident light is to reach, and the second surface being opposed to the first surface;

a first metal film disposed on the first surface side of the stacked structure;

a second metal film disposed on the second surface side of the stacked structure, the second metal film reflecting the incident light taken into the stacked structure via the first surface toward the first surface; and a drive circuit configured to control a voltage applied between the first metal film and the second metal film, and wherein the first metal film includes a plurality of partial films disposed on each of the N sub-pixels and separated from each other, each of the N sub-pixels includes a partial film and a pair of portions, the partial film corresponding to the each of the N sub-pixels among the plurality of partial films, and the pair of portions being exposed from the first metal film so as to sandwich the corresponding partial film as viewed from a stacking direction from the first surface to the second surface, and the drive circuit individually controls a potential of each of the plurality of partial films of the first metal film in order to modulate the phase of each of the N partial light beams outputted from the N sub-pixels.

7. The variable-phase device according to claim 6, further comprising:

a refractive index modulation layer having a first surface and a second surface, the first surface coinciding with the reference plane and the second surface opposed to the first surface, the refractive index modulation layer comprising a dielectric;

a Si film disposed on the first surface side of the refractive index modulation layer;

a metal film disposed on the second surface side of the refractive index modulation layer, the metal film reflecting the incident light taken into the refractive index modulation layer via the first surface toward the first surface; and a drive circuit configured to control a voltage applied between the Si film and the metal film, wherein the Si film includes a plurality of partial films disposed on each of the N sub-pixels and separated from each other, and the drive circuit individually controls a potential of each of the plurality of partial films in the Si film in order to modulate the phase of each of the N partial light beams outputted from the N sub-pixels.

8. The variable-phase device according to claim 6, further comprising:

an electro-optic crystal layer having a first surface and a second surface, the first surface coinciding with the reference plane, and the second surface being opposed to the first surface;

a first transparent electrode film disposed on the first surface side of the electro-optic crystal layer;

a light reflecting surface disposed on the second surface side of the electro-optic crystal layer, the light reflecting surface reflecting the incident light taken into the electro-optic crystal layer via the first surface toward the first surface;

a second transparent electrode film disposed between the light reflecting surface and the second surface of the electro-optic crystal layer; and a drive circuit configured to control a voltage applied between the first transparent electrode film and the second transparent electrode film, wherein at least one of the first transparent electrode film and the second transparent electrode film includes a plurality of partial films disposed on each of the N sub-pixels and separated from each other, and the drive circuit individually controls a potential of each of the plurality of partial films included in at least one of the first transparent electrode film and the second transparent electrode film in order to modulate the phase of each of the N partial light beams outputted from the N sub-pixels.

9. The variable-phase device according to claim 6, further comprising:

an electro-optic crystal layer having a first surface and a second surface, the first surface coinciding with the reference plane, and the second surface being opposed to the first surface;

a first transparent electrode film disposed on the first surface side of the electro-optic crystal layer;

a light reflecting surface disposed on the second surface side of the electro-optic crystal layer, the light reflecting surface reflecting the incident light taken into the electro-optic crystal layer via the first surface toward the first surface;

a second transparent electrode film disposed between the light reflecting surface and the second surface of the electro-optic crystal layer; and a drive circuit configured to control a voltage applied between the first transparent electrode film and the second transparent electrode film, wherein at least one of the first transparent electrode film and the second transparent electrode film includes a plurality of partial films disposed on each of the N sub-pixels and separated from each other, an optical distance between the second transparent electrode film and the light reflecting surface is different between or among the N sub-pixels so that initial phases of the N sub-pixels are different from each other, and the drive circuit individually or collectively controls potentials of the plurality of partial films included in at least one of the first transparent electrode film and the second transparent electrode film in order to modulate the phase of each of the N partial light beams outputted from the N sub-pixels.

10. The variable-phase device according to claim 9, wherein the initial phases of the N sub-pixels are shifted from each other by $2\pi/N$ (rad).

11. A variable-phase device comprising:

M pixels (where M is an integer of 2 or more) arrayed one-dimensionally along a first direction on a reference plane or arrayed two-dimensionally along the first direction and a second direction intersecting with the first direction, each of the M pixels emitting light or modulating light, wherein an array pitch defined by a distance between centers of pixels being adjacent along at least the first direction out of the M pixels is less than a wavelength of incident light and constant along the first direction, each of the M pixels includes N sub-pixels (where N is an integer of 2 or more) each having a structure capable of changing a phase of the incident light, and in each of the M pixels, partial light beams outputted from the N sub-pixels are combined into light having a single phase in a far field, wherein the variable-phase device further comprises:

a stacked structure including a transparent conductive layer and a dielectric layer and having a first surface and a second surface, the first surface coinciding with the reference plane and being a surface that the incident light is to reach, and the second surface being opposed to the first surface;

a first metal film disposed on the first surface side of the stacked structure;

a second metal film disposed on the second surface side of the stacked structure, the second metal film reflecting the incident light taken into the stacked structure via the first surface toward the first surface; and a drive circuit configured to control a voltage applied between the first metal film and the second metal film, and wherein the first metal film includes a plurality of partial films disposed on each of the N sub-pixels and separated from each other, each of the N sub-pixels includes a partial film and a pair of portions, the partial film corresponding to the each of the N sub-pixels among the plurality of partial films, and the pair of portions being exposed from the first metal film so as to sandwich the corresponding partial film as viewed from a stacking direction from the first surface to the second surface, widths of the plurality of partial films disposed on each of the N sub-pixels are different from each other, the widths being defined along the first direction, so that initial phases of the N sub-pixels are different from each other, and the drive circuit individually or collectively controls a potential of each of the plurality of partial films of the first metal film in order to modulate the phase of each of the N partial light beams outputted from the N sub-pixels.

12. The variable-phase device according to claim 11, further comprising:

a refractive index modulation layer having a first surface and a second surface, the first surface coinciding with the reference plane and the second surface opposed to the first surface, the refractive index modulation layer comprising a dielectric;

a Si film disposed on the first surface side of the refractive index modulation layer;

a metal film disposed on the second surface side of the refractive index modulation layer, the metal film reflecting the incident light taken into the refractive index modulation layer via the first surface toward the first surface; and a drive circuit configured to control a voltage applied between the Si film and the metal film, wherein the Si film includes a plurality of partial films disposed on each of the N sub-pixels and separated from each other, and the drive circuit individually controls a potential of each of the plurality of partial films in the Si film in order to modulate the phase of each of the N partial light beams outputted from the N sub-pixels.

13. The variable-phase device according to claim 11, further comprising:

an electro-optic crystal layer having a first surface and a second surface, the first surface coinciding with the reference plane, and the second surface being opposed to the first surface;

a first transparent electrode film disposed on the first surface side of the electro-optic crystal layer;

a light reflecting surface disposed on the second surface side of the electro-optic crystal layer, the light reflecting surface reflecting the incident light taken into the electro-optic crystal layer via the first surface toward the first surface;

a second transparent electrode film disposed between the light reflecting surface and the second surface of the electro-optic crystal layer; and a drive circuit configured to control a voltage applied between the first transparent electrode film and the second transparent electrode film, wherein at least one of the first transparent electrode film and the second transparent electrode film includes a plurality of partial films disposed on each of the N sub-pixels and separated from each other, and the drive circuit individually controls a potential of each of the plurality of partial films included in at least one of the first transparent electrode film and the second transparent electrode film in order to modulate the phase of each of the N partial light beams outputted from the N sub-pixels.

14. The variable-phase device according to claim 11, further comprising:

an electro-optic crystal layer having a first surface and a second surface, the first surface coinciding with the reference plane, and the second surface being opposed to the first surface;

a first transparent electrode film disposed on the first surface side of the electro-optic crystal layer;

a light reflecting surface disposed on the second surface side of the electro-optic crystal layer, the light reflecting surface reflecting the incident light taken into the electro-optic crystal layer via the first surface toward the first surface;

a second transparent electrode film disposed between the light reflecting surface and the second surface of the electro-optic crystal layer; and a drive circuit configured to control a voltage applied between the first transparent electrode film and the second transparent electrode film, wherein at least one of the first transparent electrode film and the second transparent electrode film includes a plurality of partial films disposed on each of the N sub-pixels and separated from each other, an optical distance between the second transparent electrode film and the light reflecting surface is different between or among the N sub-pixels so that initial phases of the N sub-pixels are different from each other, and the drive circuit individually or collectively controls potentials of the plurality of partial films included in at least one of the first transparent electrode film and the second transparent electrode film in order to modulate the phase of each of the N partial light beams outputted from the N sub-pixels.

15. The variable-phase device according to claim 14, wherein the initial phases of the N sub-pixels are shifted from each other by $2\pi/N$ (rad).

16. The variable-phase device according to claim 11, wherein the initial phases of the N sub-pixels are shifted from each other by $2\pi/N$ (rad).

* * * * *